United States Patent
Hori et al.

(10) Patent No.: US 11,528,773 B2
(45) Date of Patent: Dec. 13, 2022

(54) TERMINAL APPARATUS, BASE STATION APPARATUS, COMMUNICATION METHOD, AND INTEGRATED CIRCUITS FOR CONFIGURING A SERVICE DATA ADAPTATION PROTOCOL FUNCTION

(71) Applicants: Sharp Kabushiki Kaisha, Sakai (JP); FG Innovation Company Limited, Tuen Mun (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 171 days.

(21) Appl. No.: 16/623,818

(22) PCT Filed: Jun. 28, 2018

(86) PCT No.: PCT/JP2018/024706
§ 371 (c)(1),
(2) Date: Feb. 18, 2021

(87) PCT Pub. No.: WO2019/004396
PCT Pub. Date: Jan. 3, 2019

(65) Prior Publication Data
US 2021/0282220 A1    Sep. 9, 2021

(30) Foreign Application Priority Data

Jun. 28, 2017 (JP) ............................. JP2017-126273

(51) Int. Cl.
*H04W 80/08* (2009.01)
*H04W 76/27* (2018.01)

(52) U.S. Cl.
CPC .......... *H04W 80/08* (2013.01); *H04W 76/27* (2018.02)

(58) Field of Classification Search
None
See application file for complete search history.

(56) References Cited

U.S. PATENT DOCUMENTS

| 2013/0016696 A1 | 1/2013 | Adjakple et al. |
| 2016/0081081 A1 | 3/2016 | Xu et al. |

(Continued)

FOREIGN PATENT DOCUMENTS

| RU | 2608841 C1 | 1/2017 |
| WO | 2015/002404 A1 | 1/2015 |

(Continued)

OTHER PUBLICATIONS

LG Electronics Inc., "SDAP configuration", 3GPP TSG-RAN2 Meeting #98, R2-1704474, May 15-19, 2017, pp. 1-2.

(Continued)

*Primary Examiner* — Diane L Lo
(74) *Attorney, Agent, or Firm* — ScienBiziP, P.C.

(57) ABSTRACT

A technology for a terminal apparatus, a base station apparatus, a communication method, and an integrated circuit which enable efficient communication with reduced complexity of protocol processing is provided. A terminal apparatus for communicating with a base station apparatus receives an RRC connection reconfiguration request message including a Data Radio Bearer (DRB) configuration from the base station apparatus, the DRB configuration includes an SDAP configuration, the SDAP configuration includes information indicating whether an SDAP function is to be enabled or disabled, in a case that the SDAP function (Continued)

is enabled, the SDAP function is configured, and in a case that the SDAP function is disabled, the SDAP function is not configured.

8 Claims, 23 Drawing Sheets

(56) References Cited

U.S. PATENT DOCUMENTS

| | | | |
|---|---|---|---|
| 2018/0083688 A1* | 3/2018 | Agiwal | H04M 3/537 |
| 2018/0324631 A1* | 11/2018 | Jheng | H04W 28/0268 |
| 2020/0196374 A1* | 6/2020 | Lim | H04W 12/04 |

FOREIGN PATENT DOCUMENTS

| | | |
|---|---|---|
| WO | 2017/020302 | 2/2017 |
| WO | 2018/030798 | 2/2018 |

OTHER PUBLICATIONS

LG Electronics Inc., "Configurability for UL QoS flow ID marking", 3GPP TSG-RAN2 Meeting #98, R2-1704469, May 15-19, 2017, pp. 1-4.
Samsung, "On QoS flow ID size", 3GPP TSG-SA WG2 #122, S2-174662, Jun. 26-30, 2017, 2 pages.
Huawei et al., "QoS message flows", 3GPP TSG-RAN WG2 Meeting #98, R2-1704977, May 15-19, 2017, 3 pages.
"LTE; General Packet Radio Service (GPRS) enhancements for Evolved Universal Terrestrial Radio Access Network (E-UTRAN) access (3GPP TS 23.401 version 14.3.0 Release 14)", ETSI TS 123 401 V14.3.0, May 2017, 393 pages.
"3rd Generation Partnership Project; Technical Specification Group Radio Access Network; NR; Medium Access Control (MAC) protocol specification (Release 15)", 3GPP TS 38.321 V0.0.3, May 2017, pp. 1-20.
"3rd Generation Partnership Project; Technical Specification Group Radio Access Network; NR; Radio Link Control (RLC) protocol specification (Release 15)", 3GPP TS 38.322 V0.0.2, May 2017, pp. 1-18.
"3rd Generation Partnership Project; Technical Specification Group Radio Access Network; NR; Packet Data Convergence Protocol (PDCP) specification (Release 15)", 3GPP TS 38.323 V0.0.5, May 2017, pp. 1-24.
"3rd Generation Partnership Project; Technical Specification Group Radio Access Network; NR; Radio Resource Control (RRC); Protocol specification (Release 15 )", 3GPP TS 38.331 V0.0.3, May 2017, pp. 1-20.
"3rd Generation Partnership Project; Technical Specification Group Radio Access Network; NR; NR and NG-RAN Overall Description; Stage 2 (Release 15)", 3GPP TS 38.300 V0.4.1, Jun. 2017, pp. 1-54.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.1.1, Jun. 2017, pp. 1-31.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, pp. 1-106.
"3rd Generation Partnership Project; Technical Specification Group Radio Access Network; Evolved Universal Terrestrial Radio Access (E-UTRA); Radio Link Control (RLC) protocol specification (Release 14)", 3GPP TS 36.322 V14.0.0, Mar. 2017, pp. 1-45.
"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.2.0, Mar. 2017, pp. 1-43.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, pp. 1-721.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.2.0, Mar. 2017, pp. 1-330.
"3rd Generation Partnership Project; Technical Specification Group Services and System Aspects; System Architecture for the 5G System; Stage 2 (Release 15)", 3GPP TS 23.501 V1.0.0, Jun. 2017, pp. 1-145.
NTT Docomo, Inc., "New WID on New Radio Access Technology", 3GPP TSG RAN Meeting #75, RP-170855, Mar. 6-9, 2017, 14 pages.
Ericsson, NR RRCConnectionReconfiguration procedure and signalling baseline, 3GPP TSG-RAN WG2 #NR2, Qingdao, P. R. of China, Jun. 27-29, 2017, Tdoc R2-1707201.
Nokia, Alcatel-Lucent Shanghai Bell, Transparent Mode for SDAP, 3GPP TSG-RAN WG2 NR Adhoc #2, Qingdao, China, Jun. 27-29, 2017, R2-1706551.

* cited by examiner

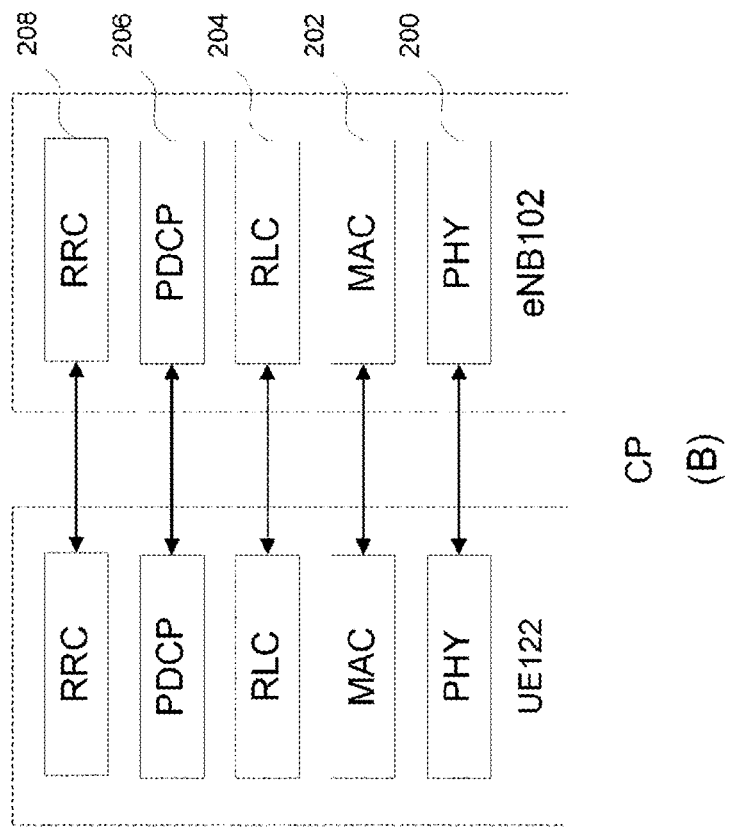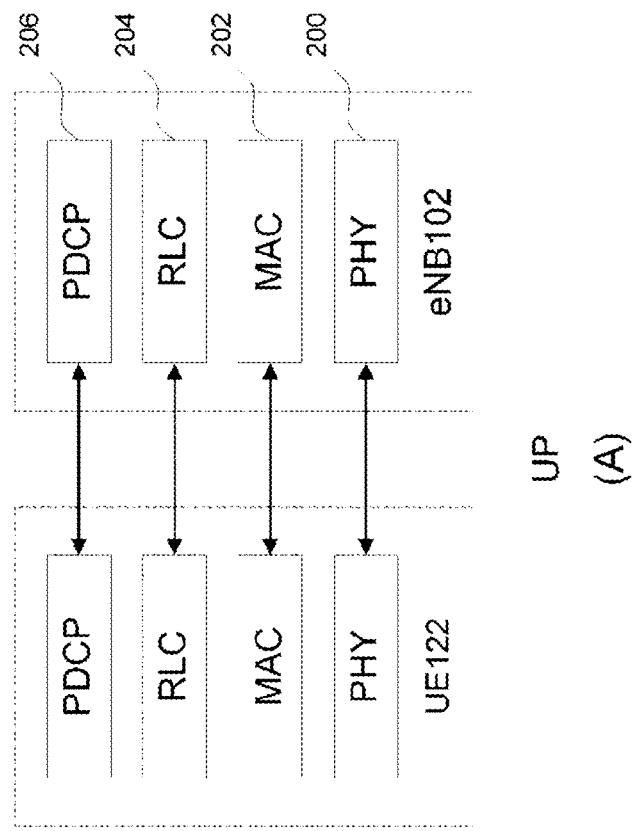
FIG. 2

```
<OMITTED>
RRCConnectionReconfiguration ::= SEQUENCE {
  rrc-TransactionIdentifier          RRC-TransactionIdentifier,
  criticalExtensions                 CHOICE {
    c1                               CHOICE{
      rrcConnectionReconfiguration-Nr    RRCConnectionReconfiguration-NR-IEs.
      <PARTLY OMITTED>
    },
    <PARTLY OMITTED>
  <PARTLY OMITTED>
}

RRCConnectionReconfiguration-NR-IEs ::= SEQUENCE {
  <PARTLY OMITTED>
  radioResourceConfigDedicated       RadioResourceConfigDedicated       OPTIONAL,
  <PARTLY OMITTED>
}

<PARTLY OMITTED>
RadioResourceConfigDedicated ::= SEQUENCE {
  <PARTLY OMITTED>
  drb-ToAddModList                   DRB-ToAddModList                   OPTIONAL,
  <PARTLY OMITTED>
  OPTIONAL,
  <PARTLY OMITTED>
}

<PARTLY OMITTED>
DRB-ToAddModList ::=                 SEQUENCE (SIZE (1..maxDRB)) OF DRB-ToAddMod
<PARTLY OMITTED>
```

FIG. 7

```
DRB-ToAddMod ::=   SEQUENCE {
    <PARTLY OMITTED>
    drb-Identity                            DRB-Identity,
    pdcp-Config                             PDCP-Config            OPTIONAL,
    rlc-Config                              RLC-Config             OPTIONAL,
    logicalChannelIdentity                  INTEGER (3..10)        OPTIONAL,
    logicalChannelConfig                    LogicalChannelConfig OPTIONAL,
    <PARTLY OMITTED>
}

PDCP-Config ::= CHOICE {
    <PARTLY OMITTED>
    pdcp-Eutra-Config                       PDCP-EUTRA-Config,
    pdcp-Nr-Config                          PDCP-EUTRA-Config,
    <PARTLY OMITTED>
}

<PARTLY OMITTED>
EUTRA-PDCP-Config::=                        SEQUENCE {
    <PARTLY OMITTED>
    pdcp-SN-Size                            ENUMERATED {len7bits, len12bits}
    <PARTLY OMITTED>
}

NR-PDCP-Config::=                           SEQUENCE {
    <PARTLY OMITTED>
    pdcp-SN-Size                            ENUMERATED {len7bits, len12bits, len18bits}
    <PARTLY OMITTED>
}

<OMITTED>
```

FIG. 8

```
<OMITTED>
DRB-ToAddModADDCG-NR ::=    SEQUENCE {
    drb-Identity-NR         DRB-Identity,
    drb-Type-NR             CHOICE {
        split-NR                NULL,
    <PARTLY OMITTED>

<OMITTED>
```

FIG. 12

```
<OMITTED>
DRB-ToAddMod ::=   SEQUENCE {
    <PARTLY OMITTED>
    drb-Identity                DRB-Identity,
    sdap-Config                     SDAP-Config        OPTIONAL,
    pdcp-Config                     PDCP-Config        OPTIONAL,
    rlc-Config                      RLC-Config         OPTIONAL,
    logicalChannelIdentity      INTEGER (3..10)        OPTIONAL,
    logicalChannelConfig        LogicalChannelConfig OPTIONAL.
    <PARTLY OMITTED>
}

SDAP-Config ::=   SEQUENCE {
    <PARTLY OMITTED>
    sdap-SN-Size                ENUMERATED [len0bits, len8bits, len16bits, len24bits],
    <PARTLY OMITTED>
}
<OMITTED>
```

FIG. 14

```
<OMITTED>
DRB-ToAddMod ::=  SEQUENCE {
    <PARTLY OMITTED>
    drb-Identity                DRB-Identity,
    sdap-Config                 SDAP-Config                OPTIONAL,
    pdcp-Config                 PDCP-Config                OPTIONAL,
    rlc-Config                  RLC-Config                 OPTIONAL,
    logicalChannelIdentity      INTEGER (3..10)            OPTIONAL,
    logicalChannelConfig        LogicalChannelConfig OPTIONAL,
    <PARTLY OMITTED>
}
    <PARTLY OMITTED>
PDCP-Config ::=  SEQUENCE {
    <PARTLY OMITTED>
    sdap-SN-Size                ENUMERATED {len0bits, len8bits, len16bits, len24bits},
    <PARTLY OMITTED>
}
<OMITTED>
```

FIG. 15

```
<OMITTED>
RRCConnectionReconfiguration ::=    SEQUENCE {
    rrc-TransactionIdentifier       RRC-TransactionIdentifier,
    criticalExtensions              CHOICE {
        c1                          CHOICE{
            rrcConnectionReconfiguration-Eutra    RRCConnectionReconfiguration-EUTRA-IEs,
            rrcConnectionReconfiguration-Nr       RRCConnectionReconfiguration-NR-IEs,
            <PARTLY OMITTED>
        }
        <PARTLY OMITTED>
}
<PARTLY OMITTED>
RRCConnectionReconfiguration-EUTRA-IEs ::= SEQUENCE {
    radioResourceConfigDedicated-Eutra    RadioResourceConfigDedicated-EUTRA    OPTIONAL,
    <PARTLY OMITTED>
}
<PARTLY OMITTED>
RRCConnectionReconfiguration-NR-IEs ::= SEQUENCE {
    radioResourceConfigDedicated-Nr       RadioResourceConfigDedicated-NR       OPTIONAL,
    <PARTLY OMITTED>
}
<PARTLY OMITTED>
RadioResourceConfigDedicated-EUTRA ::=    SEQUENCE {
    <PARTLY OMITTED>
    drb-ToAddModList-Eutra                DRB-ToAddModList-EUTRA                OPTIONAL,
    <PARTLY OMITTED>
    OPTIONAL,
    <PARTLY OMITTED>
}
```

FIG. 16

```
<PARTLY OMITTED>
RadioResourceConfigDedicated-NR ::=   SEQUENCE {
    <PARTLY OMITTED>
    drb-ToAddModList-Nr              DRB-ToAddModList-NR           OPTIONAL
    <PARTLY OMITTED>
        OPTIONAL,
    <PARTLY OMITTED>
}

<PARTLY OMITTED>
DRB-ToAddModList-EUTRA ::=   SEQUENCE (SIZE (1..maxDRB)) OF DRB-ToAddMod-EUTRA
<PARTLY OMITTED>
DRB-ToAddModList-NR ::=      SEQUENCE (SIZE (1..maxDRB)) OF DRB-ToAddMod-NR
<PARTLY OMITTED>
DRB-ToAddMod-EUTRA ::= SEQUENCE {
    <PARTLY OMITTED>
    drb-Identity                     DRB-Identity,
    pdcp-Config-Eutra                PDCP-Config-EUTRA             OPTIONAL
    rlc-Config-Eutra                 RLC-Config-EUTRA              OPTIONAL,
    logicalChannelIdentity           INTEGER (3..10)               OPTIONAL,
    logicalChannelConfig-Eutra       LogicalChannelConfig-EUTRA    OPTIONAL
    <PARTLY OMITTED>
}

DRB-ToAddMod-NR ::=   SEQUENCE {
    <PARTLY OMITTED>
    drb-Identity                     DRB-Identity,
    pdcp-Config-Nr                   PDCP-Config-NR                OPTIONAL
    rlc-Config-Nr                    RLC-Config-NR                 OPTIONAL,
    logicalChannelIdentity           INTEGER (3..10)               OPTIONAL,
    logicalChannelConfig-Nr          LogicalChannelConfig-NR       OPTIONAL
    <PARTLY OMITTED>
}
```

FIG. 17

```
<PARTLY OMITTED>
PDCP-Config-EUTRA ::= CHOICE {
    <PARTLY OMITTED>
    pdcp-Eutra-Config          PDCP-EUTRA-Config,
    pDcp-Nr-Config             PDCP-NR-Config,
    <PARTLY OMITTED>
}
<PARTLY OMITTED>
PDCP-Config-NR ::= CHOICE {
    <PARTLY OMITTED>
    pdcp-Eutra-Config          PDCP-EUTRA-Config,
    pDcp-Nr-Config             PDCP-NR-Config,
    <PARTLY OMITTED>
}
<PARTLY OMITTED>
PDCP-EUTRA-Config::=           SEQUENCE {
    <PARTLY OMITTED>
    pdcp-SN-Size               ENUMERATED {len7bits, len12bits}
    <PARTLY OMITTED>
}
<PARTLY OMITTED>
PDCP-NR-Config::=              SEQUENCE {
    <PARTLY OMITTED>
    pdcp-SN-Size               ENUMERATED {len7bits, len12bits, len18bits}
    <PARTLY OMITTED>
}
<OMITTED>
```

FIG. 18

```
<OMITTED>
DRB-ToAddMod ::=    SEQUENCE {
    <PARTLY OMITTED>
    sdap-Config                 SDAP-Config     OPTIONAL,
    pdcp-Config                 PDCP-Config     OPTIONAL,
    <PARTLY OMITTED>
}
    <PARTLY OMITTED>
SDAP-Config ::=     SEQUENCE {
    <PARTLY OMITTED>
    sdap-function               ENUMERATED {enable, disable},
    <PARTLY OMITTED>
}
PDCP-Config ::=     SEQUENCE {
    <PARTLY OMITTED>
    sdap-SN-Size                ENUMERATED {len0bits, len8bits, len16bits, len24bits},
    <PARTLY OMITTED>
}
<OMITTED>
```

FIG. 20

```
<OMITTED>
DRB-ToAddModSCG ::=   SEQUENCE {
    <PARTLY OMITTED>
    drb-Identity           DRB-Identity,
    drb-Type               CHOICE {
        split                  NULL.
        scg                    SEQUENCE {
            <PARTLY OMITTED>
            sdap-Config            SDAP-Config              OPTIONAL,
            pdcp-Config            PDCP-Config-NR           OPTIONAL,
            <PARTLY OMITTED>

<PARTLY OMITTED>
SDAP-Config ::=   SEQUENCE {
    <PARTLY OMITTED>
    sdap-function          ENUMERATED {Enable, disable},
    <PARTLY OMITTED>
PDCP-Config ::=   SEQUENCE {
    <PARTLY OMITTED>
    sdap-SN-Size           ENUMERATED {len0bits, len8bits, len16bits, len24bits},
    <PARTLY OMITTED>

<OMITTED>
```

FIG. 21

TERMINAL APPARATUS, BASE STATION APPARATUS, COMMUNICATION METHOD, AND INTEGRATED CIRCUITS FOR CONFIGURING A SERVICE DATA ADAPTATION PROTOCOL FUNCTION

TECHNICAL FIELD

The present invention relates to a terminal apparatus, a base station apparatus, a communication method, and an integrated circuit.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP).

Furthermore, as a radio access method and a radio network technology for a 5th-generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for a 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501, "System Architecture for the 5G System; Stage 2"
NPL 3: 3GPP TS 36.300, "Evolved Universal Terrestrial Radio Access (E-UTRA) and Evolved Universal Terrestrial Radio Access Network (E-UTRAN); Overall description; Stage 2"
NPL 4: 3GPP TS 36.331, "Evolved Universal Terrestrial Radio Access (E-UTRA); Radio Resource Control (RRC); Protocol specifications"
NPL 5: 3GPP TS 36.323, "Evolved Universal Terrestrial Radio Access (E-UTRA); Packet Data Convergence Protocol (PDCP) specification"
NPL 6: 3GPP TS 36.322, "Evolved Universal Terrestrial Radio Access (E-UTRA); Radio Link Control (RLC) protocol specification"
NPL 7: 3GPP TS 36.321, "Evolved Universal Terrestrial Radio Access (E-UTRA); Medium Access Control (MAC) protocol specification"
NPL 8: 3GPP TS 37.340, "Evolved Universal Terrestrial Radio Access (E-UTRA) and NR; Multi-Connectivity; Stage 2"
NPL 9: 3GPP TS 38.300, "NR; NR and NG-RAN Overall description; Stage 2"
NPL 10: 3GPP TS 38.331, "NR; Radio Resource Control (RRC); Protocol specifications"
NPL 11: 3GPP TS 38.323, "NR; Packet Data Convergence Protocol (PDCP) specification"
NPL 12: 3GPP TS 38.322, "NR; Radio Link Control (RLC) protocol specification"
NPL 13: 3GPP TS 38.321, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"

SUMMARY OF INVENTION

Technical Problem

As one of the technical studies of NR, a scheme called Multi-RAT Dual Connectivity (MR-DC) is being studied that allows cells of radio access technologies (RATs) of both E-UTRA and NR to be made into cell groups for each RAT and to be allocated to UE such that a terminal apparatus communicates with one or more base station apparatuses (NPL 8).

However, since the formats and functions of the communication protocols used in the E-UTRA and the NR differ, there is a problem in that the protocol processing becomes complex compared to Dual Connectivity in conventional LTE using only E-UTRA as a RAT, and thus a base station apparatus and a terminal apparatus are not able to efficiently communicate with each other.

In view of the circumstances described above, an object of an aspect of the present invention is to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem

In order to accomplish the object described above, an aspect of the present invention is contrived to provide the following means. That is, an aspect of the present invention is a terminal apparatus including a receiver configured to receive an RRC reconfiguration request messages including a Data Radio Bearer (DRB) configuration from a base station apparatus, the DRB configuration including information indicating whether a Service Data Adaptation Protocol (SDAP) configuration is to be performed, and a configuration unit configured to perform an SDAP entity configuration in a case that the DRB configuration includes information indicating that the SDAP configuration is to be performed as the information, in which the SDAP entity configuration is a configuration based on the SDAP configuration, and the SDAP configuration includes information indicating whether there is an SDAP header.

An aspect of the present invention is a base station apparatus including a generation unit configured to generate an RRC reconfiguration request message including a Data Radio Bearer (DRB) configuration and a transmitter configured to transmit the RRC reconfiguration request message to a terminal apparatus, in which the DRB configuration includes information indicating whether a Service Data Adaptation Protocol (SDAP) configuration is to be performed, the RRC reconfiguration request message including the DRB configuration causes the terminal apparatus to perform an SDAP entity configuration in a case that the DRB configuration includes information indicating that the SDAP configuration is to be performed as the information, the SDAP entity configuration is a configuration based on the SDAP configuration, and the SDAP configuration includes information indicating whether there is an SDAP header.

An aspect of the present invention is a method performed by a terminal apparatus, the method including: receiving an RRC reconfiguration request message including a Data Radio Bearer (DRB) configuration from a base station apparatus, the DRB configuration including information indicating whether a Service Data Adaptation Protocol (SDAP) configuration is to be performed; and performing an SDAP entity configuration in a case that the DRB configuration includes information indicating that the SDAP configuration is to be performed as the information, in which the SDAP entity configuration is a configuration based on the SDAP configuration, and the SDAP configuration includes information indicating whether there is an SDAP header.

An aspect of the invention is a method performed by a base station apparatus, the method including: generating an RRC reconfiguration request message including a Data Radio Bearer (DRB) configuration; and transmitting the RRC reconfiguration request message to a terminal apparatus, in which the DRB configuration includes information indicating whether a Service Data Adaptation Protocol (SDAP) configuration is to be performed; the RRC reconfiguration request message including the DRB configuration causes the terminal apparatus to perform an SDAP entity configuration in a case that the DRB configuration includes information indicating that the SDAP configuration is to be performed as the information, the SDAP entity configuration is a configuration based on the SDAP configuration; and the SDAP configuration includes information indicating whether there is an SDAP header.

Advantageous Effects of Invention

According to an aspect of the present invention, the terminal apparatus and the base station apparatus can lower complexity of protocol processing and communicate efficiently.

BRIEF DESCRIPTION OF DRAWINGS

FIG. 2 is a diagram of protocol stacks of a UP and a CP of a terminal apparatus and a base station apparatus in E-UTRA according to each embodiment of the present invention.

FIG. 7 is a part (first page) of a diagram illustrating an example of Abstract Syntax Notation One (ASN.1) for a DRB configuration according to each embodiment of the present invention.

FIG. 8 is another part (second page) of the diagram illustrating the example of Abstract Syntax Notation One (ASN.1) for the DRB configuration according to each embodiment of the present invention.

FIG. 12 is a diagram illustrating an example of Abstract Syntax Notation One (ASN.1) for the DRB configuration of an additional cell group in a case that a CG bearer or an SCG bearer is changed to a split bearer according to Embodiment 2 of the present invention.

FIG. 14 is a diagram illustrating an example of Abstract Syntax Notation One (ASN.1) for the DRB configuration including SDAP information according to Embodiment 3 of the present invention.

FIG. 15 is a diagram illustrating an example of Abstract Syntax Notation One (ASN.1) for the DRB configuration including SDAP information according to Embodiment 3 of the present invention.

FIG. 16 is a part (first page) of a diagram illustrating an example of Abstract Syntax Notation One (ASN.1) for the DRB configuration according to each embodiment of the present invention.

FIG. 17 is another part (second page) of the diagram illustrating the example of Abstract Syntax Notation One (ASN.1) for the DRB configuration according to each embodiment of the present invention.

FIG. 18 is another part (third page) of the diagram illustrating the example of Abstract Syntax Notation One (ASN.1) for the DRB configuration according to each embodiment of the present invention.

FIG. 20 is a diagram illustrating an example of Abstract Syntax Notation One (ASN.1) for the DRB configuration according to Embodiment 4 and Embodiment 5 of the present invention.

FIG. 21 is a diagram illustrating another example of Abstract Syntax Notation One (ASN.1) for the DRB configuration according to Embodiment 4 and Embodiment 5 of the present invention.

DESCRIPTION OF EMBODIMENTS

Embodiments of the present invention will be described below in detail with reference to the drawings.

LTE (and LTE-A Pro) and NR may be defined as RATs. The NR may be defined as a technology included in the LTE. The LTE may be defined as a technology included in the NR. Also, the LTE capable of connecting with the NR through dual connectivity may be distinguished from conventional LTE. The present embodiment may be applied to NR, LTE and other RATs. Terms associated with the LTE and the NR are used in the following description. However, the present invention may be applied to other technologies using other terms.

Figure 1:
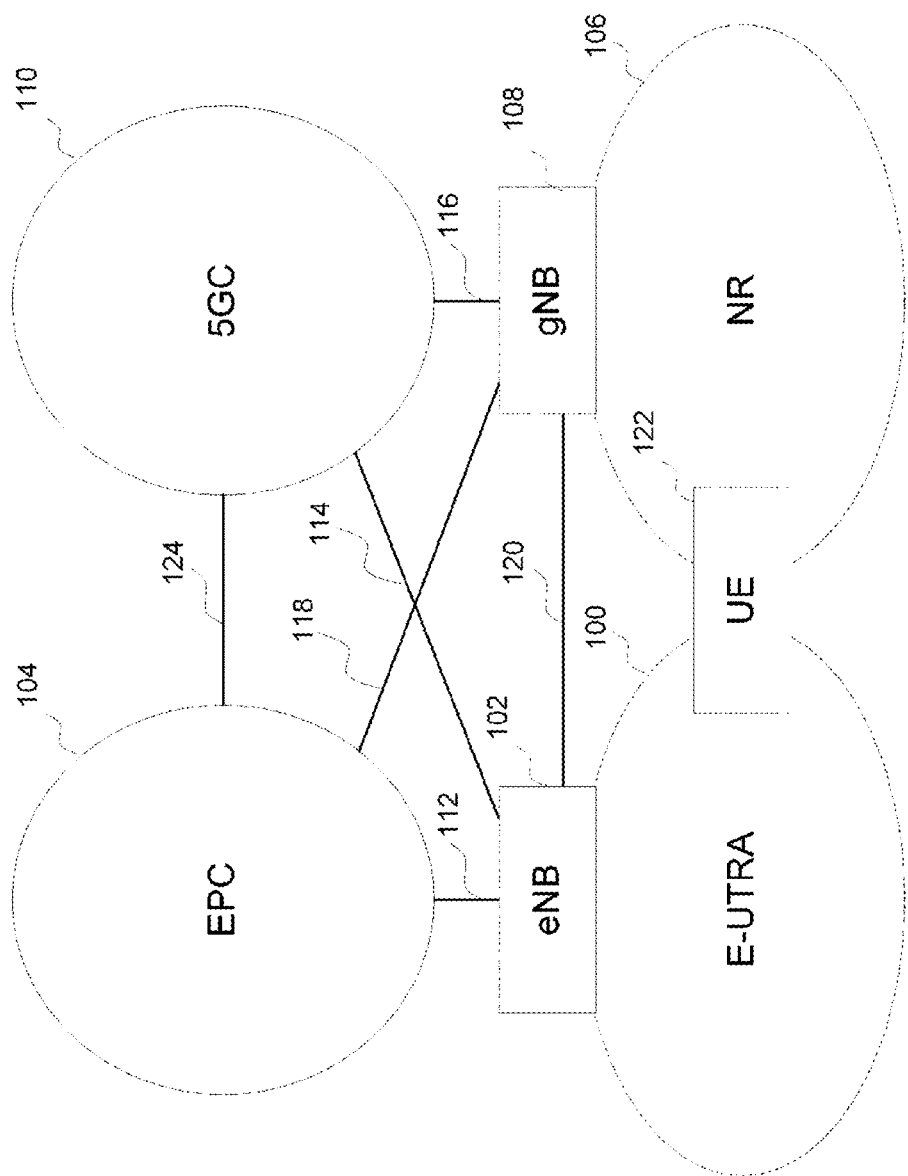
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and is constituted by a cell group (CG) configured in one or multiple frequency bands. An E-UTRAN Node B (eNB) 102 is a base station apparatus of E-UTRA. An Evolved Packet Core (EPC) 104 is a core network described in NPL 14 or the like and was designed as a core network for the E-UTRA. An interface 112 is an interface between the eNB 102 and the EPC 104, where there is a control plane (CP) through which control signals transfer and a user plane (UP) through which user data transfers.

A NR 106 is a new radio access technology that is currently being studied by the 3GPP and includes cell groups (CGs) that are configured in one or multiple frequency bands. A gNode B (gNB) 108 is an NR base station apparatus. A 5GC 110 is a new core network for the NR that is currently being studied by 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, or UP only, or both the CP and the UP, and details are being discussed by 3GPP. Furthermore, the interface 114, the interface 116, the interface 118, the interface 120, and the interface 124 may not exist depending on communication systems provided by network operators.

A UE 122 is a terminal apparatus supporting both the E-UTRA and the NR.

FIG. 2 is a diagram of protocol stacks of the UP and the CP of the terminal apparatus and the base station apparatus in the E-UTRA according to each embodiment of the present invention.

FIG. 2(A) is a diagram of a protocol stack of the UP used in a case that the UE 122 communicates with the eNB 102.

A physical layer (PHY) 200 is a radio physical layer for providing a transmission service to a higher layer by using the physical channel. The PHY 200 is connected with a Medium Access Control layer (MAC) 202 that is a higher layer to be described below via transport channels. Data is exchanged between the MAC 202 and the PHY 200 via the transport channels. The data is transmitted and/or received via the radio physical channels between the PHYs of the UE 122 and the eNB 102.

The MAC 202 maps various logical channels to various transport channels. The MAC 202 is connected with a radio link control layer (RLC) 204 which is a higher layer to be described below via logical channels. The logical channels are roughly classified depending on the type of transmitted information, specifically, classified into control channels transmitting control information and traffic channels transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

An RLC 204 divides (Segmentation) the data received from a Packet Data Convergence Protocol Layer (PDCP) 206 which is a higher layer to be described below, and adjusts the data size such that a lower layer can properly transmit data. Furthermore, the RLC 200 also has a function of ensuring Quality of Service (QoS) required for each piece of data. In other words, the RLC 204 has a function of data retransmission control or the like (NPL 6).

The PDCP 206 may have a header compression function of compressing unnecessary control information in order to efficiently transmit an IP packet, which is user data, in a radio segment. Furthermore, the PDCP 206 may also have a data encryption function (NPL 5).

Note that data processed in the MAC 202, the RLC 204, and the PDCP 206 is referred to as a MAC Protocol Data Unit (PDU), an RLC PDU, and a PDCP PDU, respectively. In addition, data transferred from the higher layer to the MAC 202, the RLC 204, and the PDCP 206 is referred to as a MAC Service Data Unit (SDU), an RLC SDU, and a PDCP SDU, respectively.

FIG. 2B is a diagram of a protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 configures and reconfigures Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Figure 3:
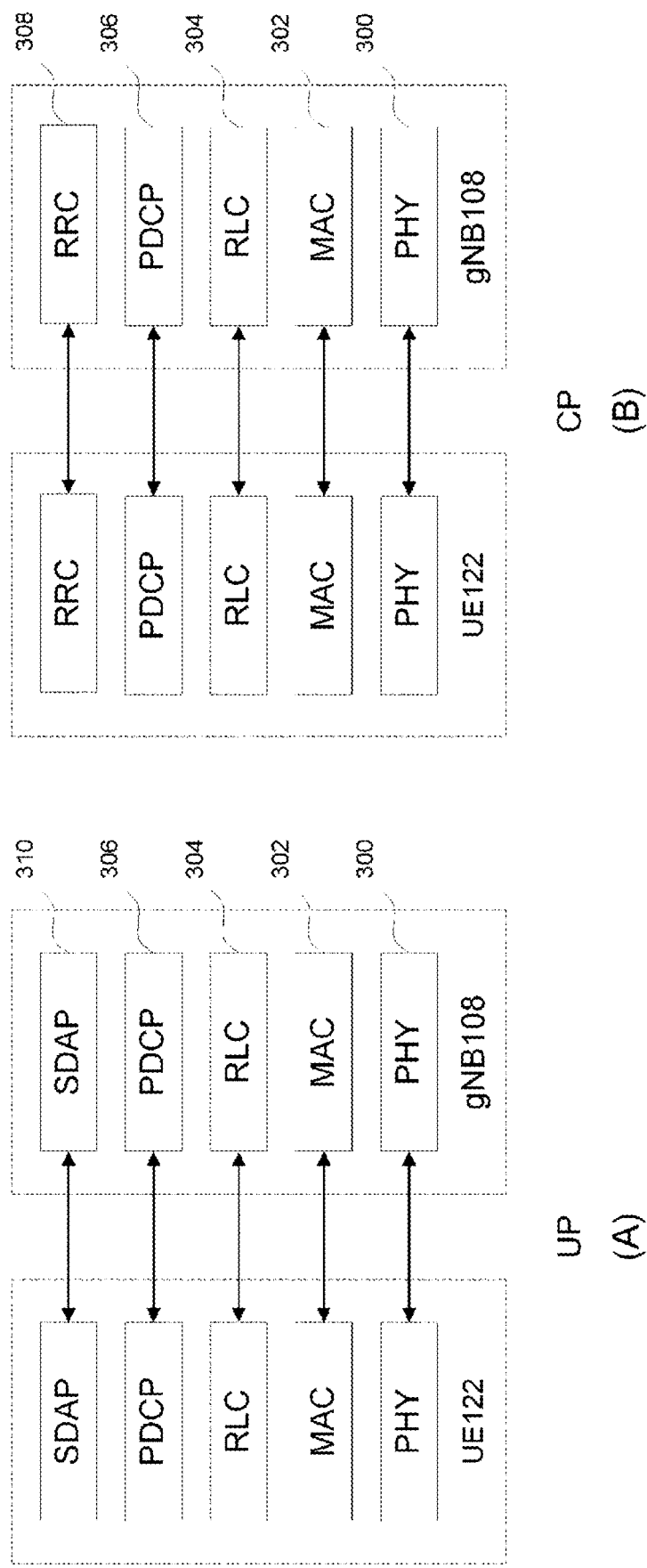
FIG. 3 is a diagram of protocol stacks of the UP and the CP of the terminal apparatus and the base station apparatus in NR according to each embodiment of the present invention.

FIG. 3 is a diagram of protocol stacks of the UP and CP of the terminal apparatus and the base station apparatus in the NR according to each embodiment of the present invention.

FIG. 3(A) is a diagram of a protocol stack of the UP used in a case that the UE 122 communicates with the gNB 108.

A physical layer (PHY) 300 is a radio physical layer of the NR and may provide a transmission service to a higher layer by using the physical channel. The PHY 300 may be connected with the Medium Access Control layer (MAC) 302 which is a higher layer to be described below via the transport channels. Data may be exchanged between the MAC 302 and the PHY 300 via the transport channels. The data may be transmitted and/or received between the PHYs of the UE 122 and the gNB 108 via the radio physical channel. Details of the PHY 300 are different from those of the radio physical layer PHY 200 of E-UTRA and are under discussion by 3GPP.

The MAC 302 may map various logical channels to various transport channels. The MAC 302 may be connected with a Radio Link Control layer (RLC) 304 which is a high layer to be described below via the logical channels. The logical channels are roughly classified depending on the type of transmitted information, and may be classified into the control channels transmitting the control information and the traffic channels transmitting the user information. The MAC 302 has a function of controlling the PHY 300 in order to perform the Discontinuous Reception and Transmission (DRX and DTX), a function of performing the random access procedure, a function of reporting the transmit power information, a function of performing the HARQ control, and the like (NPL 13). Details of the MAC 302 are different from those of the MAC 202 of the E-UTRA, and are under discussion by 3GPP.

The RLC 304 may divide (Segmentation) the data received from the Packet Data Convergence Protocol Layer (PDCP) 206 that is a higher layer to be described below, and adjust the data size such that the lower layer can properly transmit data. Furthermore, the RLC 304 may also have a function of ensuring Quality of Service (QoS) required for each piece of data. In other words, the RLC 304 may have a function of data retransmission control or the like (NPL 12). Details of the RLC 304 are different from those of the RLC 204 of the E-UTRA, and are under discussion by 3GPP.

A PDCP 306 may have a header compression function of compressing unnecessary control information in order to efficiently transmit an IP packet, which is the user data, in a radio segment. Furthermore, the PDCP 306 may also have a data encryption function (NPL 11). Details of the PDCP 306 are different from those of the PDCP 206 of the E-UTRA, and are under discussion by 3GPP.

A Service Data Adaptation Protocol (SDAP) 310 may function to map QoS of data transmitted from the 5GC 110 to the gNB 108 and data transmitted from a gNB to the 5GC 110 to QoS of an RB (NPL 9). An SDAP 310 may be present as a higher layer of the PDCP 206, which is a PDCP of the E-UTRA, in a case that the eNB 102 is directly connected to the 5GC 110, that is, connected to the 5GC via the interface 114, or in a case that the eNB 102 is indirectly connected to the 5GC 110, that is, connected to the 5GC via the interfaces 120 and 116. Details are under discussion by 3GPP.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. Furthermore, data transferred from the higher layers to the MAC 202, the RLC 204, and the PDCP 206, may be referred to as a MAC Service Data Unit (SDU), an RLC SDU, a PDCP SDU, and an SDAP SDU, respectively.

FIG. 3(B) is a diagram of a protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 may configure and reconfigure Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the gNB 108 and the UE 122 (NPL 10).

The functional classification of the MAC 302, the RLC 304, the PDCP 306, the SDAP 310, and the RRC 208 described above is an example, and some or all of the respective functions may not be implemented. Some or all of the functions of each layer may be included in another layer.

Note that, according to the embodiment of the present invention, the MAC 202, the RLC 204, the PDCP 206, and the RRC 208 may be referred to as MAC for E-UTRA, RLC for E-UTRA, RLC for E-UTRA, and RRC for E-UTRA, respectively, to distinguish protocols of the E-UTRA and the NR hereinbelow. Furthermore, the MAC 302, the RLC 304, the PDCP 306, and the RRC 308 may also be referred to as MAC for NR, RLC for NR, RLC for NR, and RRC for NR, respectively.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2.

Figure 4:
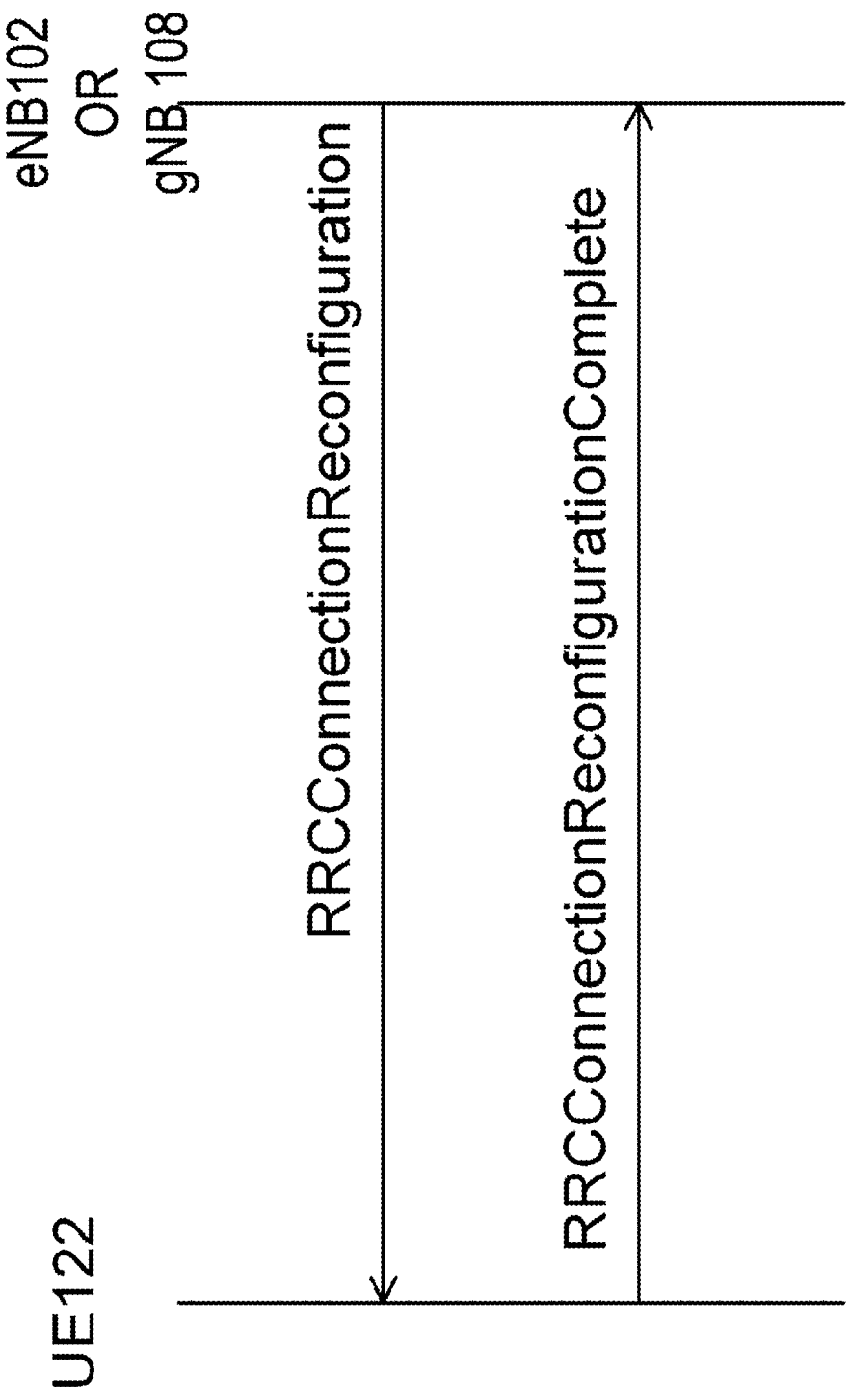
FIG. 4 is a diagram illustrating an example of a flow of an RRC connection reconfiguration procedure according to each embodiment of the present invention.

FIG. 4 is a diagram illustrating an example of a flow of an RRC connection reconfiguration procedure according to each embodiment of the present invention.

The RRC connection reconfiguration procedure includes, in addition to establishing, changing, and releasing of a RB and changing, releasing, and the like of the secondary cell in the E-UTRA as disclosed in NPL 4, procedures used for handover and measurement and the like, and it may be used in the NR for establishing, changing, and releasing the RB, adding, changing, and releasing the secondary cell, the handover and measurement, and the like, and may be described in NPL 10. According to each embodiment of the present invention, the procedures used for establishing, changing, and releasing the RB, adding, changing, and releasing a cell group, the handover and measurement, and the like in the NR may be referred to as an RRC connection reconfiguration procedure, or may have another designation. The RRC connection reconfiguration procedure according to each embodiment of the present invention may be an RRC connection reconfiguration procedure including establishing, changing, and releasing the RB in the NR, adding, changing, and releasing the cell groups, the handover and measurement, and the like.

As illustrated in FIG. 4, either the eNB 102 or the gNB 108, or both the eNB 102 and the gNB 108 transmit an RRC connection reconfiguration request message (RRCConnectionReconfiguration message) to the UE 122 in a case that RRC connection reconfiguration is necessary (S400). The UE 122 that has received the RRC connection reconfiguration request message performs configuration in accordance with information (Information Element or IE) or the like included in the RRC connection reconfiguration request message, and may transmit an RRC Connection Reconfiguration Complete message (RRCConnectionReconfiguration-Complete message) to either the eNB 102 or the gNB 108, or both the eNB and the gNB, which are transmission sources of the RRC connection reconfiguration request message to notify that the configuration is completed (S402). Note that the message designations of the RRCConnectionReconfiguration message and the RRCConnection-ReconfigurationComplete message may not be the same as those described above. Furthermore, the UE 122 may transmit an RRC connection reconfiguration complete message to both the eNB 102 and the gNB 108 regardless of whether the base station apparatus that has transmitted the RRC connection reconfiguration request is the eNB 102 or the gNB 108. Furthermore, not only in the RRC connection reconfiguration procedure but also in all or some of other measures relating to RRC (RRC connection establishment measures, RRC connection re-establishment measures, or the like), the UE 122 may transmit a completion message to both the eNB 102 and the gNB 108 in response to a request message (RRCConnectionSetup, RRCConnectionReestablishment, or the like) transmitted from either the eNB 102 or the gNB 108 or from both the eNB 102 and the gNB 108, regardless of whether the base station apparatus that has transmitted the request message is the eNB 102 or the gNB 108.

Figure 5:
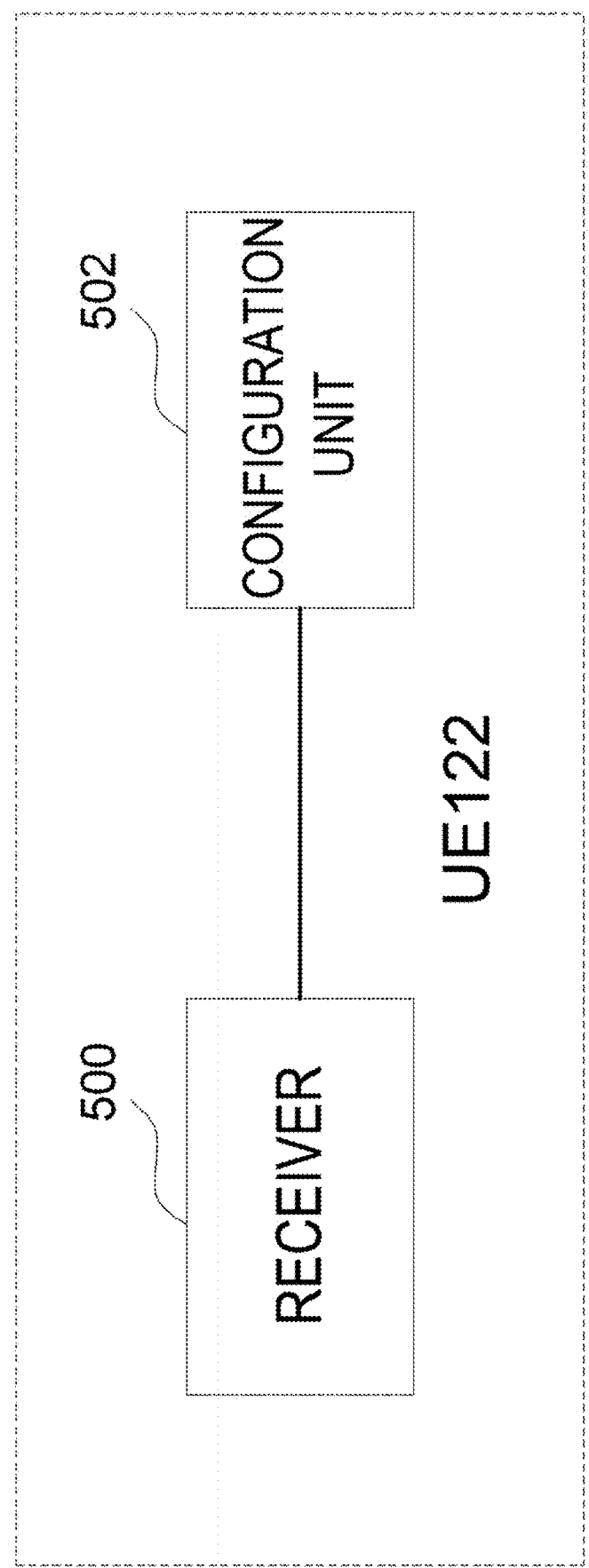
FIG. 5 is a block diagram of the terminal apparatus (UE) according to each embodiment of the present invention.

FIG. 5 is a block diagram illustrating a configuration of the terminal apparatus (UE) according to each embodiment of the present invention. Note that FIG. 5 illustrates only the main components closely related to the present invention in order to avoid complicated explanation.

The UE 122 illustrated in FIG. 5 may include a receiver 500 that receives an RRC connection reconfiguration request message from either the eNB 102 or the gNB 108, or both the eNB 102 and the gNB 108, and a configuration unit 502 that configures a DRB in accordance with a DRB configuration in a case that DRB configuration information (DRB configuration) is included in the RRC connection reconfiguration request message. The UE 122 may include functions other than those of the receiver 500 and the configuration unit 502.

Embodiment 1

Embodiment 1 of the present invention will be described with reference to FIG. 1 to FIG. 9.

Figure 6:
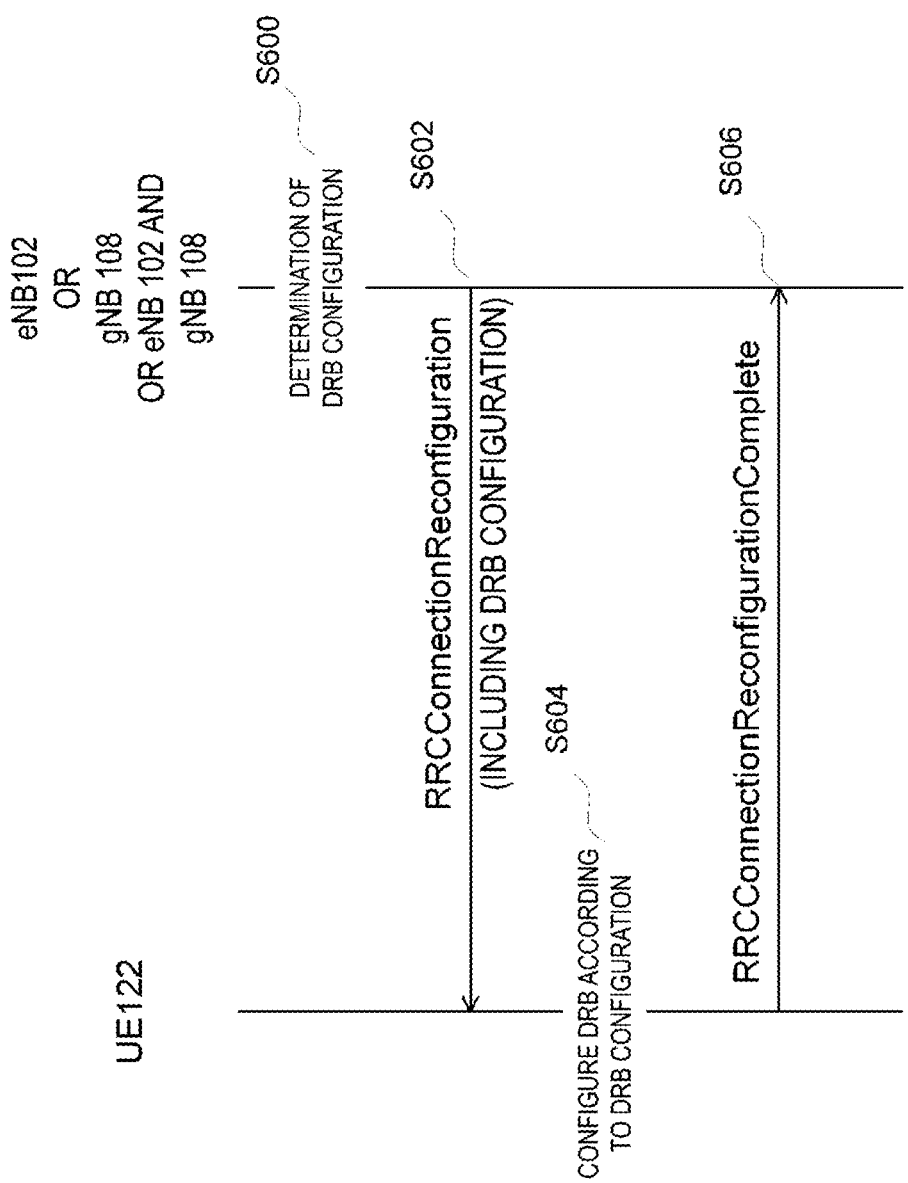
FIG. 6 is a diagram illustrating an example of DRB configuration reception and configuration according to Embodiment 1 of the present invention.

FIG. 6 is a diagram illustrating an example of DRB configuration reception and configuration according to the embodiment of the present invention. Either the eNB 102 or the gNB 108, or both the eNB 102 and the gNB 108 determine the DRB configuration to be requested to the UE 122 (S600). Either the eNB 102 or the gNB 108, or both the eNB 102 and the gNB 108 may determine the DRB configuration based on information from the core network (either the EPC 104 or the 5GC 110, or both the EPC 104 and the 5GC 110), a capability of the UE 122, or the information from the core network and the capability of the UE 122. Note that the information from the core network may be determined based on a condition of an application service such as a voice call requested by the UE 122. Then, either the eNB 102 or the gNB 108, or both the eNB 102 and the gNB 108 generate an RRC connection reconfiguration request (RRCConnectionReconfiguration) message including the DRB configuration and transmit the message to the UE 122 (S602). The receiver 500 of the UE 122 receives the RRC connection reconfiguration request message including the DRB configuration and transfers the DRB configuration to the configuration unit 502.

FIGS. 7 and 8 each are an example of Abstract Syntax Notation One (ASN.1) for the DRB configuration. The specifications related to RRC (NPL 4 and NPL 10) in the 3GPP describe messages, information (information element or IE), and the like related to RRC by using ASN.1. Note that FIG. 7 and FIG. 8 each are a part of one diagram. In other words, FIG. 7 is the first page of a diagram illustrating an example of ASN.1 for the DRB configuration and FIG. 8 is the second page of the diagram illustrating the example of ASN.1 for the DRB configuration. In the examples of ASN.1 of FIGS. 7 and 8, <omitted> and <partly omitted> are not part of the description of ASN.1 but indicate that other pieces of information are omitted. Note that there may also be omitted information in a part where neither <omitted> nor <partly omitted> is indicated.

In FIG. 8 among FIG. 7 and FIG. 8, DRB-ToAddMod included in the RRCConnectionReconfiguration message is an IE of the DRB configuration. As illustrated in FIG. 8 among FIG. 7 and FIG. 8, DRB-ToAddMod may include DRB-Identity which is an IE of a DRB identity and PDCP-Config which is PDCP configuration information corresponding to the DRB identity. Furthermore, as illustrated in FIG. 8 among FIG. 7 and FIG. 8, PDCP-Config which is the PDCP configuration information may select (CHOICE) and include PDCP-EUTRA-Config which is PDCP configuration information for E-UTRA or PDCP-NR-Config which is PDCP configuration information for NR. As illustrated in FIG. 8 among FIG. 7 and FIG. 8, PDCP-EUTRA-Config and PDCP-NR-Config may include pdcp-SN-Size information indicating a length of a sequence number(SN) of the PDCP, and the pdcp-SN-Size may be an integer including 7.

FIGS. 16, 17, and 18 each illustrate another example of Abstract Syntax Notation One (ASN.1) for the DRB configuration. Note that FIGS. 16, 17, and 18 each are a part of one diagram. In other words, FIG. 16 is the first page of a diagram illustrating the other example of ASN.1 for the DRB configuration, FIG. 17 is the second page of the diagram illustrating the other example of ASN.1 for the DRB configuration, and FIG. 18 is the third page of the diagram illustrating the other example of ASN.1 for the DRB configuration. In the examples of ASN.1 in FIGS. 16, 17, and 18, <omitted> and <partly omitted> are not part of the description of ASN.1 but indicate that other pieces of information are omitted. Note that there may also be omitted information in a part where neither <omitted> nor <partly omitted> is indicated.

In FIG. 16 among FIGS. 16, 17, and 18, the RRCConnectionReconfiguration message may select (CHOICE) and include RRCConnectionReconfiguration-EUTRA-IE which is an IE of an RRC connection reconfiguration request for E-UTRA or RRCConnectionReconfiguration-NR-IE which is an IE of an RRC connection reconfiguration request for NR.

As illustrated in FIGS. 16 and 17 among FIGS. 16, 17, and 18, in a case that the IE of the RRC connection reconfiguration request for E-UTRA is selected, DRB-ToAddMod-EUTRA which is an IE of the DRB configuration for E-UTRA may be included. As illustrated in FIG. 17 among FIGS. 16, 17, and 18, DRB-ToAddMod-EUTRA may include DRB-Identity which is an IE of the DRB identity and PDCP-Config-EUTRA which is PDCP configuration information for E-UTRA corresponding to the DRB identity. Furthermore, as illustrated in FIGS. 17 and 18 among FIGS. 16, 17, and 18, PDCP-Config-EUTRA which is PDCP configuration information for E-UTRA may further select (CHOICE) and include, as a PDCP configuration for E-UTRA, PDCP-EUTRA-Config which is the PDCP configuration information for E-UTRA or PDCP-NR-Config which is the PDCP configuration information for NR. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

As illustrated in FIGS. 16 and 17 among FIGS. 16, 17, and 18, in a case that the IE of the RRC connection reconfiguration request for NR is selected, DRB-ToAddMod-NR, which is an IE of the DRB configuration for NR may be included. As illustrated in FIG. 17 among FIGS. 16, 17, and 18, DRB-ToAddMod-NR may include DRB-Identity which is an IE of the DRB identity and PDCP-Config-NR which is the PDCP configuration information for NR corresponding to the DRB identity. As illustrated in FIGS. 17 and 18 among FIGS. 16, 17, and 18, PDCP-Config-NR which is the PDCP configuration information for NR may further select (CHOICE) and include, as a PDCP configuration for NR, PDCP-EUTRA-Config which is the PDCP configuration information for E-UTRA or PDCP-NR-Config which is the PDCP configuration information for NR. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

Note that the message designation, IE designation, parameter designation, and the like of ASN.1 in FIGS. 7, 8, 16, 17, and 18 are examples and other designations may be possible. Also, in FIGS. 7, 8, 16, 17, and 18, an RLC entity for E-UTRA and an RLC entity for NR may be described in a similar manner to the description of a PDCP entity for E-UTRA and a PDCP entity for NR. Also in FIGS. 7, 8, 16, 17, and 18, a MAC entity for E-UTRA (MACMainConfig (not illustrated), logicalChannelConfig, and the like) and a MAC entity for NR may be described in a similar manner to the description of a PDCP entity for E-UTRA and a PDCP entity for NR.

In S604 of FIG. 6, the DRB configuration received by the configuration unit 502 of the UE 122 from the receiver 500 of the UE 122 includes at least the DRB identity and either the PDCP configuration for E-UTRA or the PDCP configuration for NR as a PDCP configuration corresponding to the DRB identity. The configuration unit 502 of the UE 122 establishes or re-establishes the PDCP entity according to the DRB identity and the PDCP configuration corresponding to the DRB identity.

Figure 9:
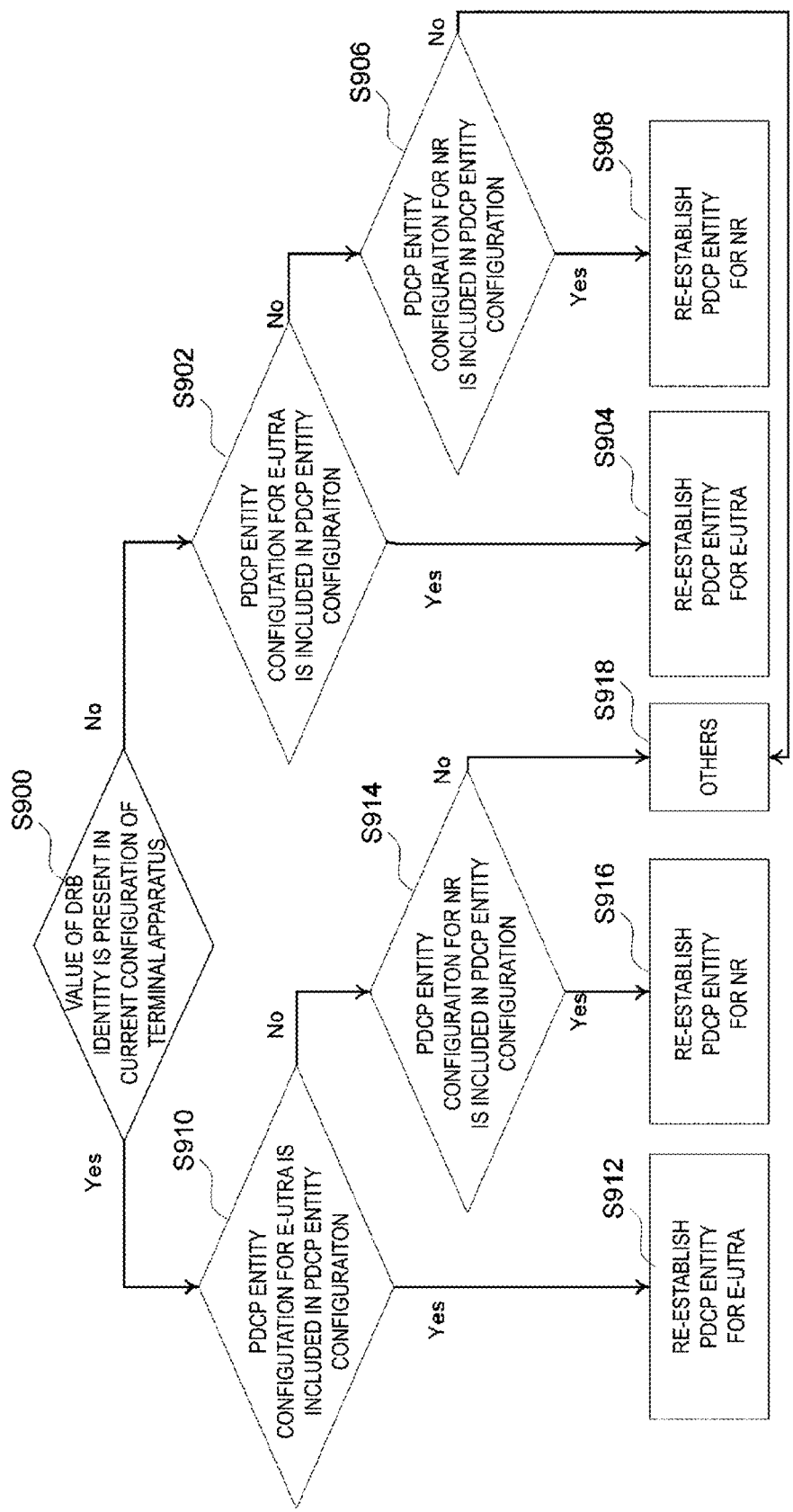
FIG. 9 is a diagram illustrating an example of determination of a PDCP configuration by a configuration unit of the terminal apparatus according to Embodiment 1 of the present invention.

FIG. 9 is an example of determination of the PDCP configuration by the configuration unit of the terminal apparatus according to the embodiment of the present invention. The configuration unit 502 of the UE 122 checks whether a value of the DRB identity is present in the current configuration of the terminal apparatus (S900). In a case that no value is present, whether the PDCP configuration for E-UTRA is included in the PDCP configuration corresponding to the DRB identity is checked (S902), and in a case that the PDCP configuration for E-UTRA is included, the PDCP entity for E-UTRA is established according to the PDCP configuration information for E-UTRA (S904). On the other hand, in a case that the PDCP entity for E-UTRA is not included in the PDCP configuration corresponding to the DRB identity, whether the PDCP configuration for NR is included in the PDCP configuration corresponding to the DRB identity is further checked (S906), and in a case that the PDCP configuration for NR is included, the PDCP entity for NR is established according to the PDCP configuration information for NR (S908). Furthermore, in a case that the PDCP configuration for NR is not included in the PDCP configuration corresponding to the DRB identity, another configuration is performed (S918).

On the other hand, in a case that the value of the DRB identity is present in the current configuration of the terminal apparatus, whether the PDCP configuration for E-UTRA is included in the PDCP configuration corresponding to the DRB identity is checked (S910), and in a case that the PDCP configuration for E-UTRA is included, the PDCP entity for E-UTRA is re-established according to the PDCP configuration information for E-UTRA (S912). On the other hand, in a case that the PDCP configuration for E-UTRA is not included in the PDCP configuration corresponding to the DRB identity, whether the PDCP configuration for NR is included in the PDCP configuration corresponding to the DRB identity is further checked (S914), and in a case that the PDCP configuration for NR is included, the PDCP entity for NR is re-established according to the PDCP configuration information for NR (S916). Furthermore, in a case that the PDCP configuration for NR is not included in the PDCP configuration corresponding to the DRB identity, another configuration is performed (S918). The PDCP entity for E-UTRA and the PDCP entity for NR may be switched in the above-described re-establishment process. For example, in a case that the PDCP configuration corresponding to a certain DRB identity (denoted as DRB identity 1) present in the current configuration of the UE 122 is the PDCP configuration for E-UTRA, the above-described DRB identity 1 is included in the DRB configuration included in the received RRC connection reconfiguration message, and the PDCP configuration corresponding to the DRB identity 1 is the PDCP configuration for NR, the PDCP entity corresponding to the DRB identity 1 is reconfigured as the PDCP entity for NR. Similarly, in a case that the PDCP configuration corresponding to a certain DRB identity (denoted as DRB identity 2) present in the current configuration of the UE 122 is the PDCP configuration for NR, the above-described DRB identity 2 is included in the DRB configuration included in the received RRC connection reconfiguration message, and the PDCP configuration corresponding to the DRB identity 2 is the PDCP configuration for E-UTRA, the PDCP entity corresponding to the DRB identity 2 is reconfigured as the PDCP entity for E-UTRA. In this manner, the PDCP configuration for E-UTRA and the PDCP configuration for NR may be switched by the RRC connection reconfiguration message. Note that the configuration of the PDCP entity of FIG. 9 may be read as the PDCP configuration.

In FIG. 6, after completing the configuration in the configuration unit 502 of the UE 122, the UE 122 transmits an RRC connection reconfiguration complete (RRCConnectionReconfigurationComplete) message to either the eNB 102 or the gNB 108, or both the eNB 102 and the gNB 108 (S606).

Note that the DRB configuration according to the present embodiment may be included in an RRC Connection Establishment procedure and an RRC Connection Re-Establishment procedure, in addition to the RRC connection reconfiguration procedure. In addition, the re-establishment of the PDCP entity according to the present embodiment may include, for example, a zero reset of the Hyper Frame Number (HFN) described in NPL 5, a change to an initial mode (Initialization and Refresh or IR) of compression of the header, a change to a specified cryptographic algorithm and a cryptographic key, and the like. Note that, although the zero reset of the Hyper Frame Number (HFN) described in the non-patent document, the change to the initial mode of (Initialization and Refresh or IR) of the compression of the header, and the change to the specified cryptographic algorithm and the cryptographic key are for E-UTRA, they may be applied for NR.

As described above, in the present embodiment, either the base station apparatus of E-UTRA (eNB) or the base station apparatus of NR (gNB), or both the eNB and the gNB select whether the PDCP entity to be used in communication with the UE is for E-UTRA or NR based on the condition of the application service, such as a voice call, and the like requested by the terminal apparatus (UE), and notify the UE of the result of the selection using the RRC connection reconfiguration message. Thus, the PDCP entity suitable for the application service to be used by the UE can be established, and communication can be efficiently performed with reduced complexity of protocol processing.

Embodiment 2

In Embodiment 2 of the present invention, a DRB configuration in a case of "E-UTRAN supports Multi-RAT Dual Connectivity (MR-DC) via E-UTRA-NR Dual Connectivity" (EN-DC) will be described below. In the En-DC, particularly an EPC serves as a core network and the base station apparatus on the E-UTRA side serves as a master base station apparatus to be described below in Multi-RAT Dual Connectivity (MR-DC). The MR-DC is a mechanism which has been studied as one of technologies for NR. In the MR-DC, cells of Radio Access Technologies (RATs) of both E-UTRA and NR are cell-grouped for each RAT and allocated to a UE for communication between the UE and one or more base station apparatuses.

Embodiment 2 will be described using FIG. 1 and FIGS. 5 to 12.

Figure 10:
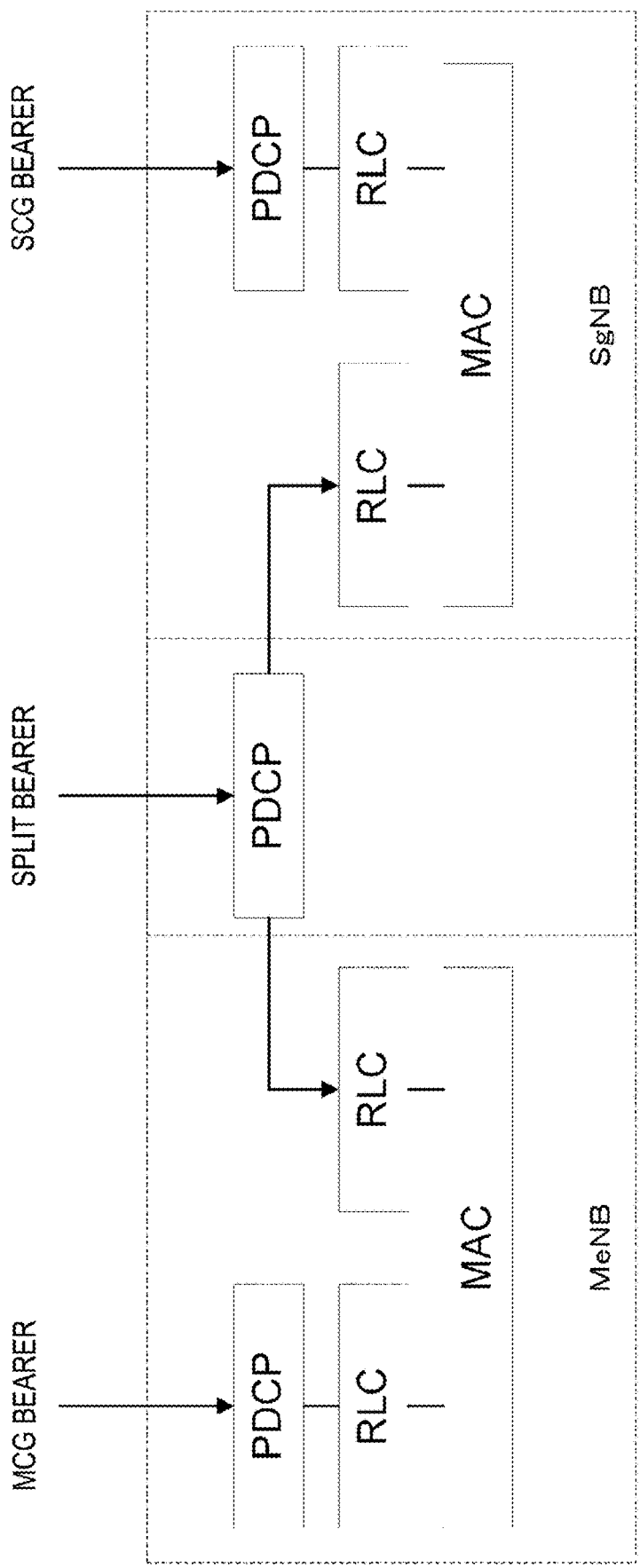
FIG. 10 is a diagram illustrating an example of a relationship between radio protocol architecture and RBs in EN-DC on the base station apparatus side according to Embodiment 2 and Embodiment 5 of the present invention.

FIG. 10 is a diagram illustrating an example of a relationship between radio protocol architecture and RBs in the EN-DC on the base station apparatus side according to the embodiment of the present invention.

The EN-DC may be a technology for performing data communication by using radio resources of two cell groups respectively configured by two base station apparatuses with EPC as a core network. The two base station apparatuses, that is, a base station apparatus of E-UTRA as a master base station (Master eNB or MeNB) and a base station apparatus of NR as a secondary base station (Secondary gNB or SgNB) respectively configures the two cell groups, that is a Master Cell Group (MCG) configured by the MeNB and a Secondary Cell Group (SCG) configured by the SgNB. In the MR-DC, the master base station may be a base station having primary RRC functions related to the MR-DC, for example, establishment, change, and release of the RB, addition, change, and release of an additional cell such as a secondary cell, handover, and the like, and the secondary base station may be a base station having some RRC functions, for example, change and release of the SCG, and the like.

As illustrated in FIG. 10, in the EN-DC, some pieces of data to be transmitted and/or received is transmitted and/or received on the SgNB side, and the remainder is transmitted and/or received on the MeNB side. A data transmission and/or reception method in the EN-DC may include a method in which a node in the EPC serves as an anchor point as a point of bifurcation and confluence of data and each of the MeNB and the SgNB establishes a bearer as a logical path with the EPC to perform data transmission and/or reception, that is, data is transmitted and/or received using an MCG bearer on the MeNB side and an SCG bearer on the SgNB side, and a method in which the MeNB or the SeNB serves as the anchor point, and data transmission and/or reception is performed using a split bearer obtained by splitting a Radio Bearer (RB), which is a bearer on the radio side, for the MeNB and the SeNB. As for the split bearer, there may be a method for establishing the split bearer at the time of establishing the radio bearer and a method for establishing the MCG bearer or the SCG bearer and then changing the MCG bearer or the SCG bearer to the split bearer by adding the radio bearer on the SCG side or the MCG side. The establishment and change of the MCG bearer, the SCG bearer, and the split bearer may be performed by a Radio Resource Control (RRC) connection reconfiguration procedure performed and transmitted between the MeNB and the UE. In the present embodiment, the cell group of the base station apparatus serving as the anchor point of the split bearer is referred to as an anchor cell Group, and the cell group of the base station apparatus that does not serve as the anchor point of the split bearer is referred to as an additional cell group. The anchor cell group may be the MCG, the additional cell group may be the SCG, the anchor cell group may be the SCG, and the additional cell group may be the MCG. The split bearer in the case that the anchor cell group is the MCG may be referred to as an MCG split bearer, or the split bearer in the case that the anchor cell group is the SCG may be referred to as an SCG split bearer.

In the EN-DC, with respect to downlink data in a case of data transmission and/or reception using the split bearer, part of the downlink data transferred from the EPC may be distributed by the base station apparatus of the anchor cell group to the base station apparatus of the additional cell group, and transmitted by the base station apparatus of the additional cell group to the UE, and the remaining data may be transmitted from the base station apparatus of the master cell group to the UE. With respect to uplink data, part of the uplink data may be transmitted by the UE to the base station apparatus of the additional cell group and distributed by the base station apparatus of the additional cell group to the base station apparatus of the master cell group, and the remaining data may be transmitted by the UE to the base station apparatus of the master cell group.

As illustrated in FIG. 10, in a case that the split bearer is used, the PDCP PDU may be transmitted and/or received between the base station apparatus of the master cell group and the base station apparatus of the additional cell group.

Figure 11:
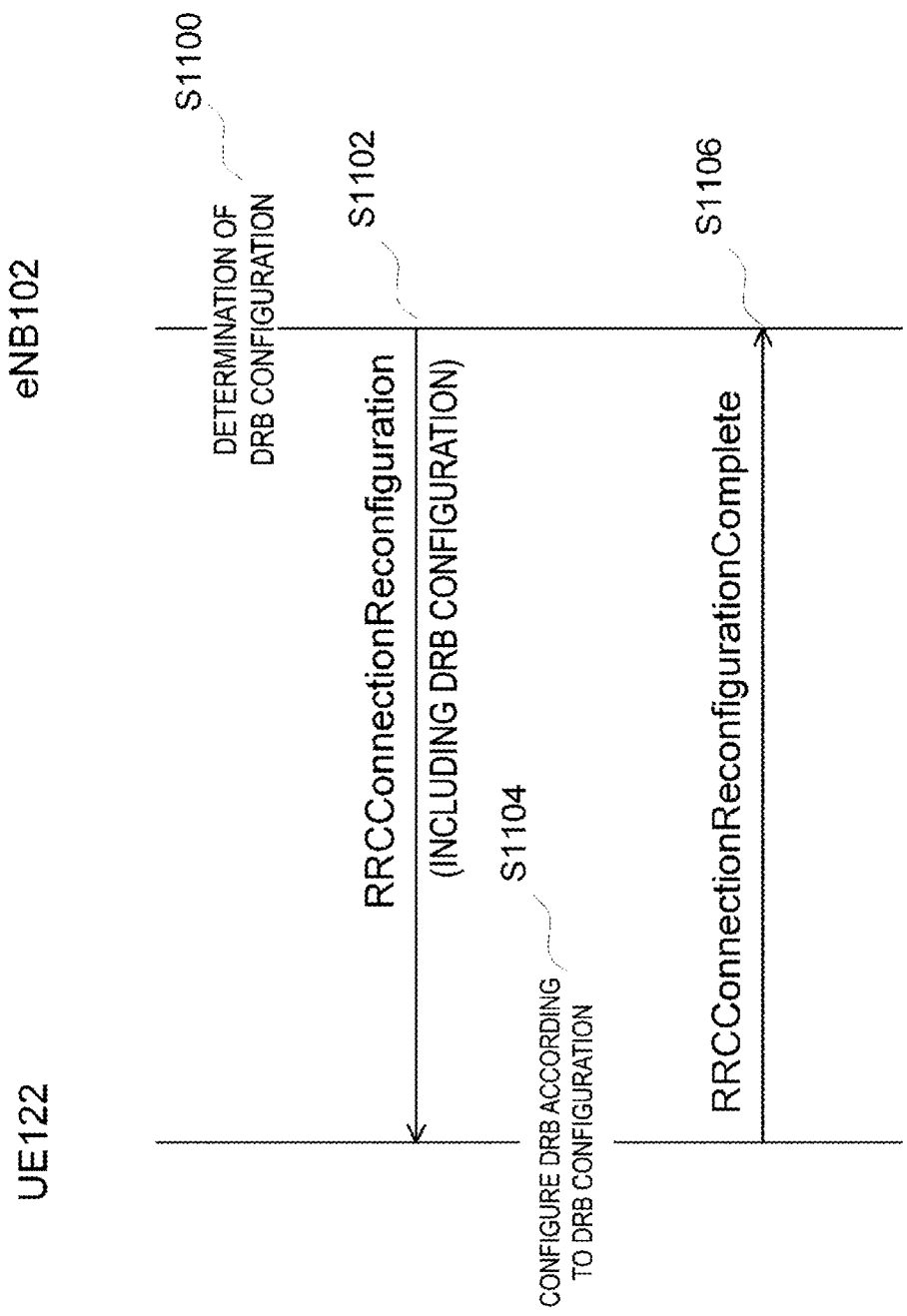
FIG. 11 is a diagram illustrating an example of the DRB configuration reception and configuration in a case that an MCG bearer or an SCG bearer is established as a bearer of an anchor cell group according to Embodiment 2 of the present invention.

FIG. 11 is a diagram illustrating an example of the DRB configuration reception and configuration in a case that the MCG bearer or the SCG bearer is established as a bearer of an anchor cell group according to the embodiment of the present invention. Note that, even in a case that a bearer is established as the anchor cell group, the bearer may not be changed to the split bearer later. The eNB 102 determines the DRB configuration to be requested to the UE 122 (S1100). The eNB 102 may determine the DRB configuration based on either information from the core network (the EPC 104) or a capability of the UE 122, or the information from the core network and the capability of the UE 122. Note that the information from the core network may be determined based on a condition of an application service, such as a voice call, requested by the UE 122. Next, the eNB 102 generates the RRC connection reconfiguration request (RRCConnectionReconfiguration) message including the DRB configuration and transmits the message to the UE 122 (S1102). The receiver 500 of the UE 122 receives the RRC connection reconfiguration request message including the DRB configuration and transfers the DRB configuration to the configuration unit 502.

FIGS. 7 and 8 are an example of Abstract Syntax Notation One (ASN.1) for the DRB configuration described in Embodiment 1.

That is, in FIG. 8 among FIGS. 7 and 8, DRB-ToAddMod included in the RRCConnectionReconfiguration message is the IE of the DRB configuration. As illustrated in FIG. 8 among in FIGS. 7 and 8, DRB-ToAddMod may include DRB-Identity, which is an IE of a DRB identity and PDCP-Config which is PDCP configuration information corresponding to the DRB identity. Furthermore, as illustrated in FIG. 8 among FIGS. 7 and 8, PDCP-Config which is the PDCP configuration information may select (CHOICE) and include PDCP-EUTRA-Config which is the PDCP configuration information for E-UTRA, or PDCP-NR-Config which is the PDCP configuration information for NR. As illustrated in FIG. 8 among FIGS. 7 and 8, PDCP-EUTRA-Config and PDCP-NR-Config may include pdcp-SN-Size information indicating the length of the sequence number(SN) of the PDCP, and the pdcp-SN-Size may be an integer including 7.

FIGS. 16, 17, and 18 illustrate another example of Abstract Syntax Notation One (ASN.1) for the DRB configuration described in Embodiment 1.

That is, in FIG. 16 among FIGS. 16, 17, and 18, the RRCConnectionReconfiguration message may select (CHOICE) and include RRCConnectionReconfiguration-EUTRA-IE that is the IE of the RRC connection reconfiguration request for E-UTRA or RRCConnectionReconfiguration-NR-IE that is the IE of the RRC connection reconfiguration request for NR.

As illustrated in FIGS. 16, and 17 among FIGS. 16, 17, and 18, in a case where the IE of the RRC connection reconfiguration request for E-UTRA is selected, DRB-ToAddMod-EUTRA, which is the IE of DRB configuration for E-UTRA may be included. As illustrated in FIG. 17 among FIGS. 16, 17, and 18, DRB-ToAddMod-EUTRA may include DRB-Identity which is the IE of the DRB identity and PDCP-Config-EUTRA which is the PDCP configuration information for E-UTRA corresponding to the DRB identity. Furthermore, as illustrated in FIGS. 17 and 18 among FIGS. 16, 17, and 18, PDCP-Config-EUTRA which is the PDCP configuration information for E-UTRA may further select (CHOICE) and include PDCP-EUTRA-Config which is the PDCP configuration information for E-UTRA, or PDCP-NR-Config which is the PDCP configuration information for NR, as the PDCP configuration for E-UTRA. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

As illustrated in FIGS. 16 and 17 among FIGS. 16, 17, and 18, in a case that the IE of the RRC connection reconfiguration request for NR is selected, DRB-ToAddMod-NR, which is the IE of the DRB configuration for NR may be included. As illustrated in FIG. 17 among FIGS. 16, 17, and 18, DRB-ToAddMod-NR may include DRB-Identity which is the IE of the DRB identity and PDCP-Config-NR which is the PDCP configuration information for NR corresponding to the DRB identity. As illustrated in FIGS. 17 and 18 among FIGS. 16, 17, and 18, PDCP-Config-NR which is the PDCP configuration information for NR may further select (CHOICE) and include PDCP-EUTRA-Config which is the PDCP configuration information for E-UTRA or PDCP-NR-Config which is the PDCP configuration information for NR, as the PDCP configuration for NR. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

Note that, as described in Embodiment 1, the message designation, IE designation, parameter designation, and the like of ASN.1 in FIGS. 7 and 8, and FIGS. 16, 17, and 18 are examples and other designations may be possible. Also, in FIGS. 7 and 8, and FIGS. 16, 17, and 18, an RLC entity for E-UTRA and an RLC entity for NR may be described in a similar manner to the description of a PDCP entity for E-UTRA and a PDCP entity for NR. Furthermore, in FIGS. 7 and 8, and FIGS. 16, 17, and 18, the MAC entity for E-UTRA (such as MACMainConfig (not illustrated) and logicalChannelConfig) and the MAC entity for NR may be described in a similar manner to the description of the PDCP entity for E-UTRA and the PDCP entity for NR.

In S1104 of FIG. 11, the DRB configuration that the receiver 500 of the UE 122 transfers to the configuration unit 502 of the UE 122 includes at least the DRB identity and either the PDCP configuration for E-UTRA or the PDCP configuration for NR as the PDCP configuration corresponding to the DRB identity. The configuration unit 502 of the UE 122 establishes or re-establishes the PDCP entity according to the DRB identity and the PDCP configuration corresponding to the DRB identity.

FIG. 9 is an example of determination of the PDCP configuration by the configuration unit of the terminal apparatus, as described in Embodiment 1. In other words, the configuration unit 502 of the UE 122 checks whether the value of the DRB identity is present in the current configuration of the terminal apparatus (S900). In a case that no value is present, whether the PDCP configuration for E-UTRA is included in the PDCP configuration corresponding to the DRB identity is checked (S902), and in a case that the PDCP configuration for E-UTRA is included, the PDCP entity for E-UTRA is established according to the PDCP configuration information for E-UTRA (S904). On the other hand, in a case that the PDCP configuration for E-UTRA is not included in the PDCP configuration corresponding to the DRB identity, whether the PDCP configuration for NR is included in the PDCP configuration corresponding to the DRB identity is included is further checked (S906). In a case that the PDCP configuration for NR is included, the PDCP entity for NR is established according to the PDCP configuration information for NR (S908). Furthermore, in a case that the PDCP configuration for NR is not included in the PDCP configuration corresponding to the DRB identity, another configuration is performed (S918).

On the other hand, in a case that the value of the DRB identity is present in the current configuration of the terminal apparatus, whether the PDCP configuration for E-UTRA is included in the PDCP configuration corresponding to the DRB identity is checked (S910). In a case the PDCP configuration for E-UTRA is included, the PDCP entity for E-UTRA is re-established according to the PDCP configuration information for E-UTRA (S912). On the other hand, in a case that the PDCP configuration for E-UTRA is not included in the PDCP configuration corresponding to the DRB identity, whether the PDCP configuration for NR is included in the PDCP configuration corresponding to the DRB identity is further checked (S914). In a case that the PDCP configuration for NR is included, the PDCP entity for NR is re-established according to the PDCP configuration information for NR (S916). Furthermore, in a case that the PDCP configuration for NR is not included in the PDCP configuration corresponding to the DRB identity, another configuration is performed (S918). The PDCP entity for E-UTRA and the PDCP entity for NR may be switched through the above-described re-establishment process. For example, in a case that the PDCP configuration corresponding to a certain DRB identity (denoted as DRB identity 1) present in the current configuration of the UE 122 is the PDCP configuration for E-UTRA, the above-described DRB identity 1 is included in the DRB configuration included in the received RRC connection reconfiguration message, and the PDCP configuration corresponding to the DRB identity 1 is the PDCP configuration for NR, the PDCP entity corresponding to the DRB identity 1 is reconfigured as the PDCP entity for NR. Similarly, in a case that the PDCP configuration corresponding to a certain DRB identity (denoted as DRB identity 2) present in the current configuration of the UE 122 is the PDCP configuration for NR, the above-described DRB identity 2 is included in the DRB configuration included in the received RRC connection reconfiguration message, and the PDCP configuration corresponding to the DRB identity 2 is the PDCP configuration for E-UTRA, the PDCP entity corresponding to the DRB identity 2 is reconfigured as the PDCP entity for E-UTRA. In this manner, the PDCP configuration for E-UTRA and the PDCP configuration for NR may be switched by the RRC connection reconfiguration message. Note that the PDCP entity configuration may be replaced with the PDCP configuration in FIG. 9.

In FIG. 11, after completing the configuration in the configuration unit 502 of the UE 122, the UE 122 transmits the RRC connection reconfiguration complete (RRCConnectionReconfigurationComplete) message to the eNB 102 (S1106).

Note that the DRB configuration according to the present embodiment may be included in an RRC Connection Establishment procedure and an RRC Connection Re-Establishment procedure, in addition to the RRC connection reconfiguration procedure. In addition, the re-establishment of the PDCP entity according to the present embodiment may include, for example, a zero reset of the Hyper Frame Number (HFN), a change to an initial mode (Initialization and Refresh or IR) of compression of the header, a change to a specified cryptographic algorithm and cryptographic key, and the like which are described in NPL 5. Note that, although the zero reset of the Hyper Frame Number (HFN), the change to the initial mode of (Initialization and Refresh or IR) of the compression of the header, and the change to the specified cryptographic algorithm and cryptographic key which are described in the non-patent literature are for E-UTRA, they may be applied for NR.

Next, a change from the MCG bearer or the SCG bearer to a split bearer will be described.

FIG. 12 is an example of Abstract Syntax Notation One (ASN.1) for the DRB configuration of an additional cell group in a case that the MCG bearer or the SCG bearer is changed to the split bearer. In the example of ASN.1 of FIG. 12, <omitted> and <partly omitted> are not part of the description of ASN.1, but indicate that other pieces of information are omitted. Note that there may also be omitted information in a part where neither <omitted> nor <partly omitted> is indicated. The example of ASN.1 illustrated in FIG. 12 may be a part of the example of ANS.1 illustrated in FIGS. 7 and 8, or FIGS. 16, 17, and 18. The IE of DRB-ToAddModADDCG-NR IE illustrated in FIG. 12 is related to the DRB configuration of the additional cell group and may have another designation. The IE of DRB-ToAddModADDCG-NR IE illustrated in FIG. 12 may be a part of the higher layer IE for the additional cell group configuration.

In FIG. 11, the eNB 102 determines the DRB configuration for the anchor cell group and the DRB configuration for the additional cell group to be requested to the UE 122 (S1100). However, the DRB configuration of the anchor cell group may not be changed. In a case that the DRB configuration of the anchor cell group is changed, the DRB configuration of the anchor cell group may include entity configuration information such as the DRB identity and the PDCP configuration corresponding to the DRB identity to be changed. Additionally, in a case that the DRB configuration of the anchor cell group is not changed, only the DRB identity may be included in the DRB configuration of the anchor cell group. The eNB102 may determine whether to change the DRB configuration of the anchor cell group based on either information from the core network (the EPC 104) or the capability of the UE 122, or both the information from the core network and the capability of the UE 122. Note that the information from the core network may be determined based on a condition of an application service such as a voice call requested by the UE 122. Next, the eNB 102 generates an RRC connection reconfiguration request (RRCConnectionReconfiguration) message including the DRB configuration of the anchor cell and the DRB configuration of the additional cell and transmits the message to the UE 122 (S1102). The receiver 500 of the UE 122 receives the RRC connection reconfiguration request messages including the DRB configuration of the anchor cell and the DRB configuration of the additional cell, and transfers the DRB configuration of the anchor cell and the DRB configuration of the additional cell to the configuration unit 502.

The configuration unit 502 of the UE 122 determines to change the MCG bearer or the SCG bearer that is already present to the split bearer in a case that a value of the DRB identity included in the DRB configuration of the anchor cell group is present in the current configuration of the UE 122 and the DRB identity included in the DRB configuration of the anchor cell group is the DRB identity included in the DRB configuration of the additional cell group, that is, in a case that the value of the DRB identity of the anchor cell group and the value of the DRB identity of the additional cell group are the same and the DRB type of the additional cell group (drb-Type-NR in FIG. 12, or the like) is split. Note that the determination method for changing the MCG bearer or the SCG bearer that is already present to the split bearer is not limited to the above, and another method may be applied.

The configuration unit 502 of the UE 122 may establish a DRB of the additional cell group according to the DRB configuration of the additional cell group, and may re-establish the PDCP entity according to the PDCP configuration in a case that there is the PDCP configuration corresponding to the DRB identity in the DRB configuration of the anchor cell group. The PDCP entity for E-UTRA and the PDCP entity for NR may be switched through the above-described re-establishment process. For example, in a case that the PDCP configuration corresponding to a certain DRB identity (denoted as DRB identity 1) present in the current configuration of the UE 122 is the PDCP entity for E-UTRA, the DRB configuration included in the received RRC connection reconfiguration message includes the above-described DRB identity 1, and the PDCP configuration corresponding to the DRB identity 1 is the PDCP configuration for NR, the PDCP entity corresponding to the DRB identity 1 is reconfigured as a PDCP entity for NR. Similarly, in a case that the PDCP configuration corresponding to a certain DRB identity (denoted as DRB identity 2) present in the current configuration of the UE 122 is the PDCP entity for NR, the DRB configuration included in the received RRC connection reconfiguration message includes the above-described DRB identity 2, and the PDCP configuration corresponding to the DRB identity 2 is the PDCP configuration for E-UTRA, the PDCP entity corresponding to the DRB identity 2 is reconfigured as the PDCP entity for E-UTRA. In this manner, the PDCP configuration for E-UTRA and the PDCP configuration for NR may be switched by the RRC connection reconfiguration message.

Thus, in the present embodiment, based on the condition of the application service, such as a voice call, and the like requested by the terminal apparatus (UE), even in the EN-DC, the anchor cell group selects whether the PDCP entity used in communication with the UE is for E-UTRA or NR and notifies the UE of the result of the selection using the RRC connection reconfiguration message. Thus, the PDCP entity suitable for the application service to be used by the UE can be established even in the EN-DC, and communication can be efficiently performed with reduced complexity of protocol processing.

Embodiment 3

In Embodiment 3 of the present invention, the DRB configuration including an SDAP configuration in a case that the core network is the 5GC 110 will be described. In Embodiment 3, the UE 122 may communicate with the 5GC 110 via the gNB, may communicate with the 5GC via the eNB, or may communicate with the 5GC using the MR-DC serving as both the gNB and the eNB.

Embodiment 3 will be described with reference to FIGS. 1, 5, 7, and 8, FIGS. 13 to 15, and FIGS. 16, 17, and 18.

Figure 13:
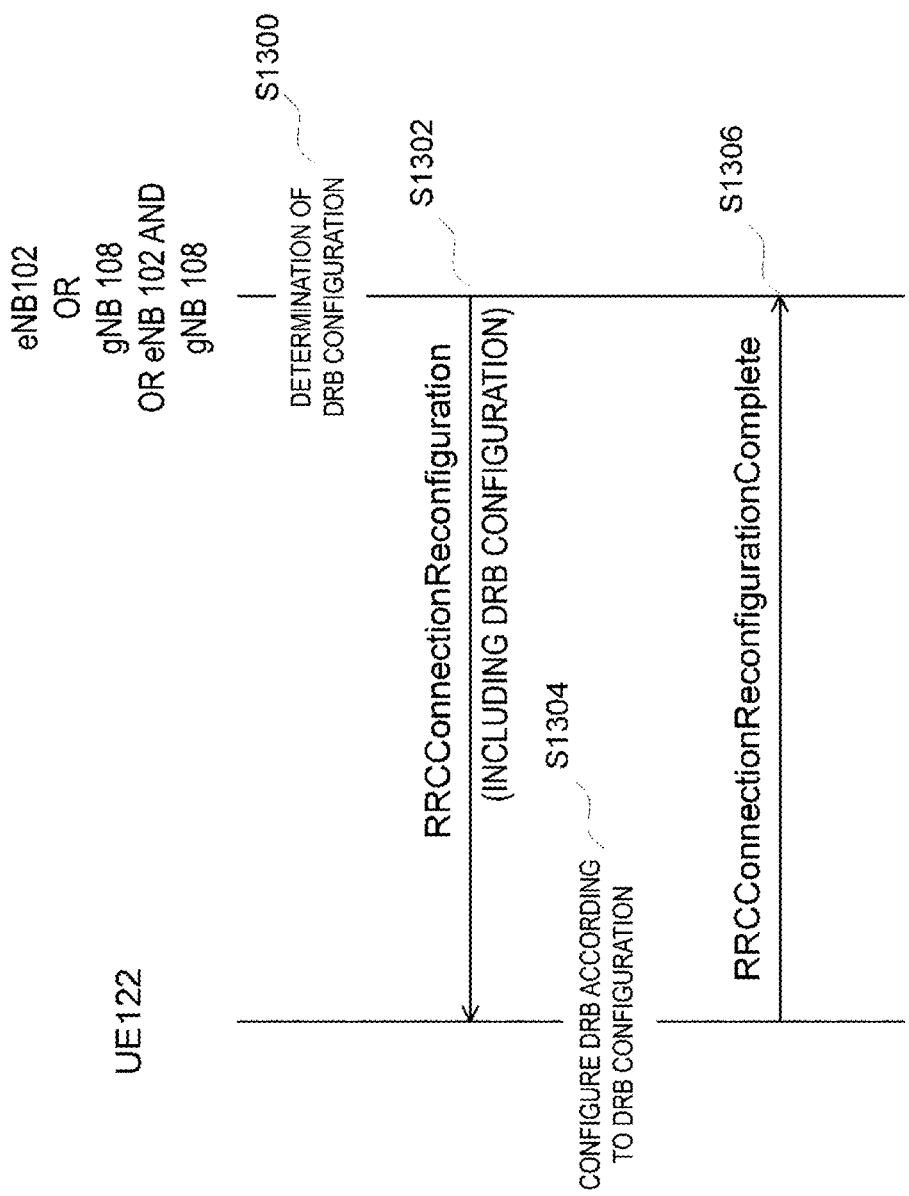
FIG. 13 is a diagram illustrating an example of the DRB configuration reception and configuration according to Embodiment 3 of the present invention.

FIG. 13 is a diagram illustrating an example of the DRB configuration reception and configuration according to the embodiment of the present invention. Either the eNB 102 or the gNB 108, or both the eNB 102 and the gNB 108 determine the DRB configuration including the SDAP configuration to be requested to the UE 122 (S1300). Either the eNB 102 or the gNB 108, or both the eNB 102 and the gNB 108 may determine the DRB configuration based on information from the core network (either the EPC 104 or the 5GC 110, or both the EPC 104 and the 5GC 110), a capability of the UE 122, or the information from the core network and the capability of the UE 122. Note that the information from the core network may be determined based on a condition of an application service such as a voice call requested by the UE 122. Furthermore, the DRB configuration may include information of SDAP, such as a length of an SDAP header. In addition, the information on SDAP may be included in the SDAP configuration, or may be included in other entity configuration such as a PDCP configuration. Next, either the eNB 102 or the gNB 108, or both the eNB 102 and the gNB 108 generate an RRC connection reconfiguration request (RRCConnectionReconfiguration) message including the DRB configuration and transmit the message to the UE 122 (S1302). The receiver 500 of the UE 122 receives the RRC connection reconfiguration request message including the DRB configuration and transfers the DRB configuration to the configuration unit 502.

FIGS. 14 and 15 illustrate an example of Abstract Syntax Notation One (ASN.1) for the DRB configuration including SDAP information according to the embodiment of the present invention. In the example of ASN.1 of FIGS. 14 and 15, <omitted> and <partly omitted> are not part of the description of ASN.1, but indicate that other pieces of information are omitted. Note that there may also be omitted information in a part where neither <omitted> nor <partly omitted> is indicated.

FIG. 14 is an example in which the SDAP configuration includes SDAP header length information, and FIG. 15 is an example in which other PDCP configuration includes a length of the SDAP header. The SDAP header length information may be information included in either the SDAP configuration or the PDCP configuration, or may be information included in both the SDAP configuration and the PDCP configuration. The length of the SDAP header may be a length having a value of a multiple of eight including zero (0). For example, in the example of FIGS. 14 and 15, "len0bits," "len8bits," "len16bits," and "len24bits" may be 0 bits, 8 bits, 12 bits, and 24 bits, respectively. Alternatively, it may be indicated in units of byte such as "len0bytes," "len1byte," "len2bytes," or "len3bytes" or octet. Note that the length of the SDAP header being zero may mean that no SDAP header is present. Furthermore, an indication and a designation of the length of the SDAP header is not limited thereto and another indication or designation may be possible. Furthermore, the message designation, IE designation, parameter designation, and the like of ASN.1 in FIGS. 14 and 15 are examples and other designations may be possible. Furthermore, the example of ASN.1 illustrated in FIGS. 14 and 15 may be a part of the example of ASN.1 illustrated in FIGS. 7 and 8, or FIGS. 16, 17, and 18.

The configuration unit 502 of the UE 122 will be described using the example of FIG. 14, that is, an example in a case that the SDAP configuration includes the length of the SDAP header. In S1304 of FIG. 13, the DRB configuration that the receiver 500 of the UE 122 transfers to the configuration unit 502 of the UE 122 includes at least the DRB identity and the SDAP configuration corresponding to the DRB identity, and the SDAP configuration includes the length of the SDAP header. The configuration unit 502 of the UE 122 establishes or re-establishes the SDAP entity according to the DRB identity and the SDAP configuration corresponding to the DRB identity. In other words, in a case that a value of the DRB identity transferred from the receiver 500 is not present in the current configuration of the terminal apparatus, the SDAP entity may be established. In a case that the value of the DRB identity transferred from the receiver 500 is present in the current configuration of the terminal apparatus, the SDAP entity may be re-established. Note that, in a case that the length of the SDAP header is zero, a process of establishing the SDAP entity but not admitting the presence of the SDAP header may be performed, or a process of not establishing the SDAP entity may be performed.

The configuration unit 502 of the UE 122 will be described using the example of FIG. 15, that is, an example in a case that the PDCP configuration includes the length of the SDAP header. In S1304 of FIG. 13, the DRB configuration that the receiver 500 of the UE 122 transfers to the configuration unit 502 of the UE 122 includes at least the DRB identity and the PDCP configuration corresponding to the DRB identity, and the PDCP configuration includes the length of the SDAP header. The configuration unit 502 of the UE 122 establishes or re-establishes the PDCP entity according to the DRB identity and the PDCP configuration corresponding to the DRB identity. In other words, in a case that the value of the DRB identity transferred from the receiver 500 is not present in the current configuration of the terminal apparatus, the PDCP entity may be established, and in a case that the value of the DRB identity transferred from the receiver 500 is present in the current configuration of the terminal apparatus, the PDCP entity may be re-established. The established or re-established PDCP entity may specify an SDAP SDU, that is, a starting position of IP packets, from the SDAP header length information and perform header compression processing. Note that, even in a case that the length of the SDAP header is not included in the PDCP configuration but is included in the SDAP configuration, the PDCP entity may specify the SDAP SDU, that is, the starting position of IP packets from the SDAP header length information included in the SDAP configuration and perform header compression processing.

In FIG. 13, after completing the configuration in the configuration unit 502 of the UE 122, the UE 122 transmits an RRC connection reconfiguration complete (RRCConnectionReconfigurationComplete) message to either the eNB 102 or the gNB 108, or both the eNB 102 and the gNB 108 (S1306).

Note that the DRB configuration according to the present embodiment may be included in an RRC Connection Establishment procedure and an RRC Connection Re-Establishment procedure, in addition to the RRC connection reconfiguration procedure. Furthermore, the re-establishment of the PDCP entity according to the present embodiment includes, for example, a zero reset of the Hyper Frame Number (HFN), a change to the initial mode (Initialization and Refresh or IR) of the compression of the header, a change to a specified cryptographic algorithm and a cryptographic key, and the like, which are described in NPL 5. Note that, although the zero reset of the Hyper Frame Number (HFN), the change to the initial mode (Initialization and Refresh or IR) of the compression of the header, and the change to the specified cryptographic algorithm and the cryptographic key which are described in the non-patent literature are for E-UTRA, they may be applied for NR.

Although the DRB configuration according to the present embodiment has been described assuming a case that the core network is 5GC, the DRB configuration may also be applied to a case that the core network is EPC.

Thus, in the present embodiment, based on the condition of the application service, such as a voice call, and the like requested by the terminal apparatus (UE), either the base station apparatus of E-UTRA (eNB) or the base station apparatus of NR (gNB), or both the eNB and the gNB perform the SDAP configuration including the length of the SDAP header or the PDCP configuration including the length of the SDAP header to be used in communication with the UE, and notify the UE of the configuration using the RRC connection reconfiguration message. Accordingly, the length of the SDAP header suitable for application service used by the UE can be used, the header can be compressed using the PDCP entity as needed, and communication can be efficiently performed with reduced complexity of protocol processing.

Embodiment 4

Embodiment 4 of the present invention will be described with reference to FIGS. 1, 5, and 19 to 23.

Figure 19:
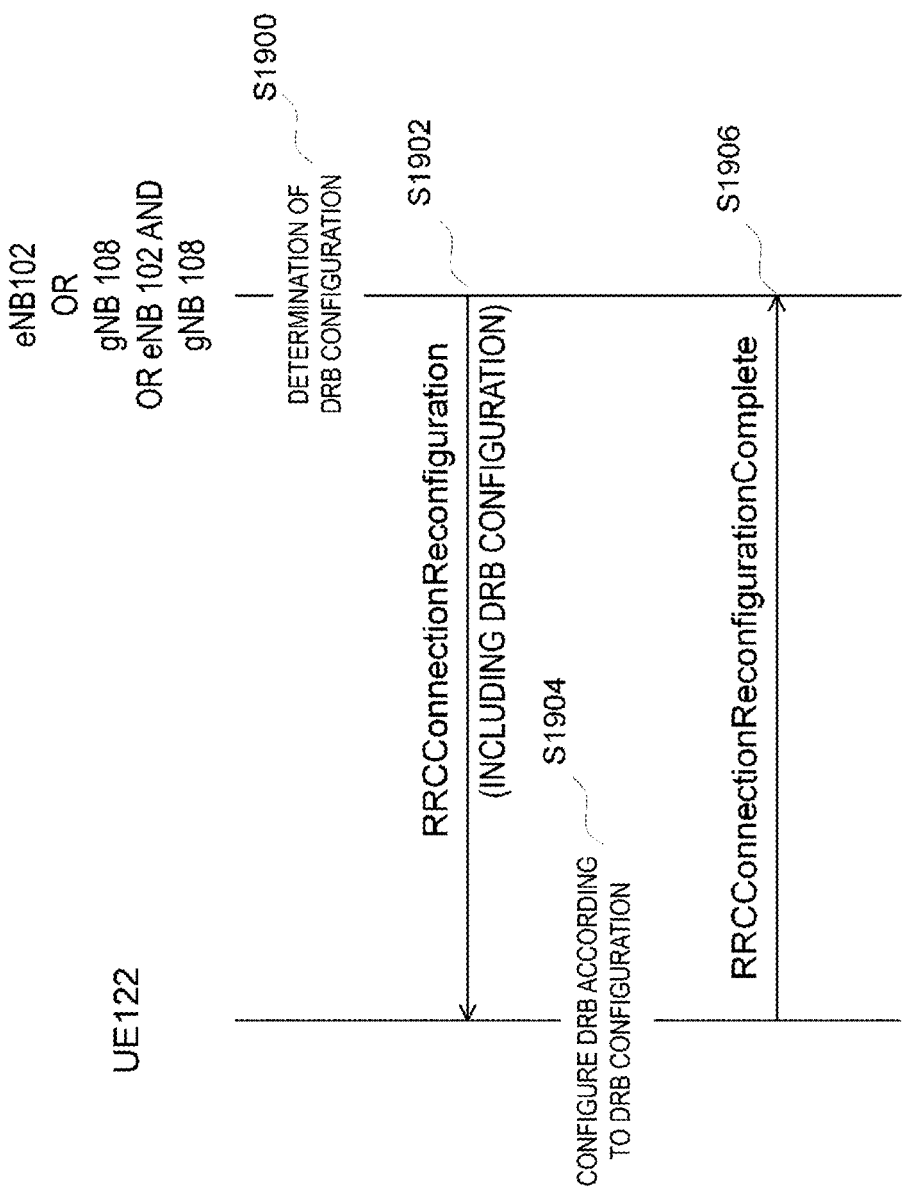
FIG. 19 is a diagram illustrating an example of the DRB configuration reception and configuration according to Embodiment 4 of the present invention.

FIG. 19 is a diagram illustrating an example of the DRB configuration reception and configuration according to the embodiment of the present invention. Either the eNB 102 or the gNB 108, or both the eNB 102 and the gNB 108, determine a DRB configuration to be requested to the UE 122 (S1900). Either the eNB 102 or the gNB 108, or both the eNB 102 and the gNB 108 may determine the DRB configuration based on information from the core network (either the EPC 104 or the 5GC 110, or both the EPC 104 and the 5GC 110), a capability of the UE 122, or the information from the core network and the capability of the UE 122. Note that the information from the core network may be determined based on a condition of an application service, such as a voice call, requested by the UE 122. Then, either the eNB 102 or the gNB 108, or both the eNB 102 and the gNB 108 generate an RRC connection reconfiguration request (RRCConnectionReconfiguration) message including the DRB configuration and transmit the message to the UE 122 (S1902). The receiver 500 of the UE 122 receives the RRC connection reconfiguration request message including the DRB configuration and transfers the DRB configuration to the configuration unit 502.

FIG. 20 is an example of Abstract Syntax Notation One (ASN.1) for the DRB configuration. The specifications related to RRC (NPL 4 and NPL 10) in the 3GPP describe messages, information (information element or IE), and the like related to the RRC by using ASN.1. In the example of ASN.1 of FIG. 20, <omitted> and <partly omitted> are not part of the description of ASN.1, but indicate that other pieces of information are omitted. Note that there may also be omitted information in a part where neither <omitted> nor <partly omitted> is indicated.

In FIG. 20, DRB-ToAddMod is an IE of the DRB configuration. As illustrated in FIG. 20, DRB-ToAddMod may include SDAP-Config which is the SDAP configuration information. As illustrated in FIG. 20, SDAP-Config may include information indicating whether sdap-function, which is configuration information for an SDAP function, is to be enabled or disabled. The SDAP function may be an SDAP function including a function of managing the mapping between a QoS Flow Identifier (QFI) described in NPL 2 which is QoS information of the 5GC 110 and a DRB. Furthermore, the SDAP function may also be a function including, in data transmitted by the UE 122 to either the eNB 102 or the gNB 108, or both the eNB 102 and the gNB 108, the same information as the QoS information included in data transmitted by either the eNB 102 or the gNB 108, or both the eNB 102 and the gNB 108 to the UE 122. Note that the information indicating whether to be enabled or disabled may not be indicated with "enable" or "disable," but may be indicated with "activate" or "diactivate," or "true" or "false." Furthermore, the information indicating whether to be enabled or disabled may be other expressions. Furthermore, as illustrated in FIG. 20, PDCP-Config which is the PDCP configuration information may be included. Furthermore, as illustrated in FIG. 20, PDCP-Config may include the length of the SDAP header. The length of the SDAP header may be a length having a multiple value of 8. For example, in the example of FIG. 20, "len0bits," "len8bits," "len16bits," and "len24bits" may be 0 bits, 8 bits, 12 bits, and 24 bits, respectively. Alternatively, it may be indicated in units of byte such as "len0bytes," "len1byte," "len2bytes," or "len3bytes" or octet. Note that the length of the SDAP header being zero may mean that no SDAP header is present. Furthermore, an indication and designation of the length of the SDAP header is not limited thereto and another indication or designation may be possible.

FIG. 21 is another example of Abstract Syntax Notation One (ASN.1) for the DRB configuration. Note that, in the example of ASN.1 of FIG. 21, <omitted> and <partly omitted> are not part of the description of ASN.1, but indicate that other pieces of information are omitted. Note that there may also be omitted information in a part where neither <omitted> nor <partly omitted> is indicated.

In FIG. 21, DRB-ToAddModSCG is an IE for the DRB configuration. Note that DRB-ToAddModSCG illustrated in FIG. 21 may be the DRB configuration for an additional cell group described in Embodiment 2. As illustrated in FIG. 21, DRB-ToAddModSCG may include SDAP-Config, which is the SDAP configuration information. Furthermore, as illustrated in FIG. 21, SDAP-Config may include information indicating whether sdap-function, which is the configuration information for the SDAP function, is to be enabled or disabled. The SDAP function may be an SDAP function including a function of managing the mapping between a QoS Flow Identifier (QFI) described in NPL 2 which is QoS information of the 5GC 110 and a DRB. Furthermore, the SDAP function may also be a function of including, in data transmitted by the UE 122 to either the eNB 102 or the gNB 108, or both the eNB 102 and the gNB 108, the same information as the QoS information included in data transmitted by either the eNB 102 or the gNB 108, or both the eNB 102 and the gNB 108 to the UE 122. Note that the information indicating whether to be enabled or disabled may not be indicated with "enable" or "disable," but may be indicated with "activate" or "diactivate," or "true" or "false." Furthermore, the information indicating whether to be enabled or disabled may be other expressions. Furthermore, as illustrated in FIG. 21, PDCP-Config which is the PDCP configuration information may be included. Furthermore, as illustrated in FIG. 21, PDCP-Config may include the length of the SDAP header. The length of the SDAP header may be a length having a multiple value of 8. For example, in the example of FIG. 21, "len0bits," "len8bits," "len16bits," and "len24bits" may be 0 bits, 8 bits, 12 bits, and 24 bits, respectively. Alternatively, it may be indicated in units of byte such as "len0bytes," "len1byte," "len2bytes," or "len3bytes" or octet. Note that the length of the SDAP header being zero may mean that no SDAP header is present. Furthermore, an indication and designation of the length of the SDAP header is not limited thereto and another indication or designation may be possible.

Note that DRB-ToAddMod in FIG. 20 and DRB-ToAddModSCG in FIG. 21 may include an IE uniquely representing a PDU session identifier or a PDU session identifier as an IE described in NPL 2. There may be multiple DRB configurations for a value of one PDU session identifier. There may be only one SDAP configuration for a value of one PDU session identifier. That is, the SDAP configuration may be in only one DRB configuration among multiple DRB configurations for one PDU session identifier.

Furthermore, the message designation, IE designation, parameter designation, and the like of ASN.1 in FIGS. 20 and 21 are examples and other designations may be possible.

In S1904 of FIG. 19, the DRB configuration received by the configuration unit 502 of the UE 122 from the receiver 500 of the UE 122 may include the SDAP configuration. The configuration unit 502 of the UE 122 configures or reconfigures the SDAP according to the SDAP configuration.

Figure 22:
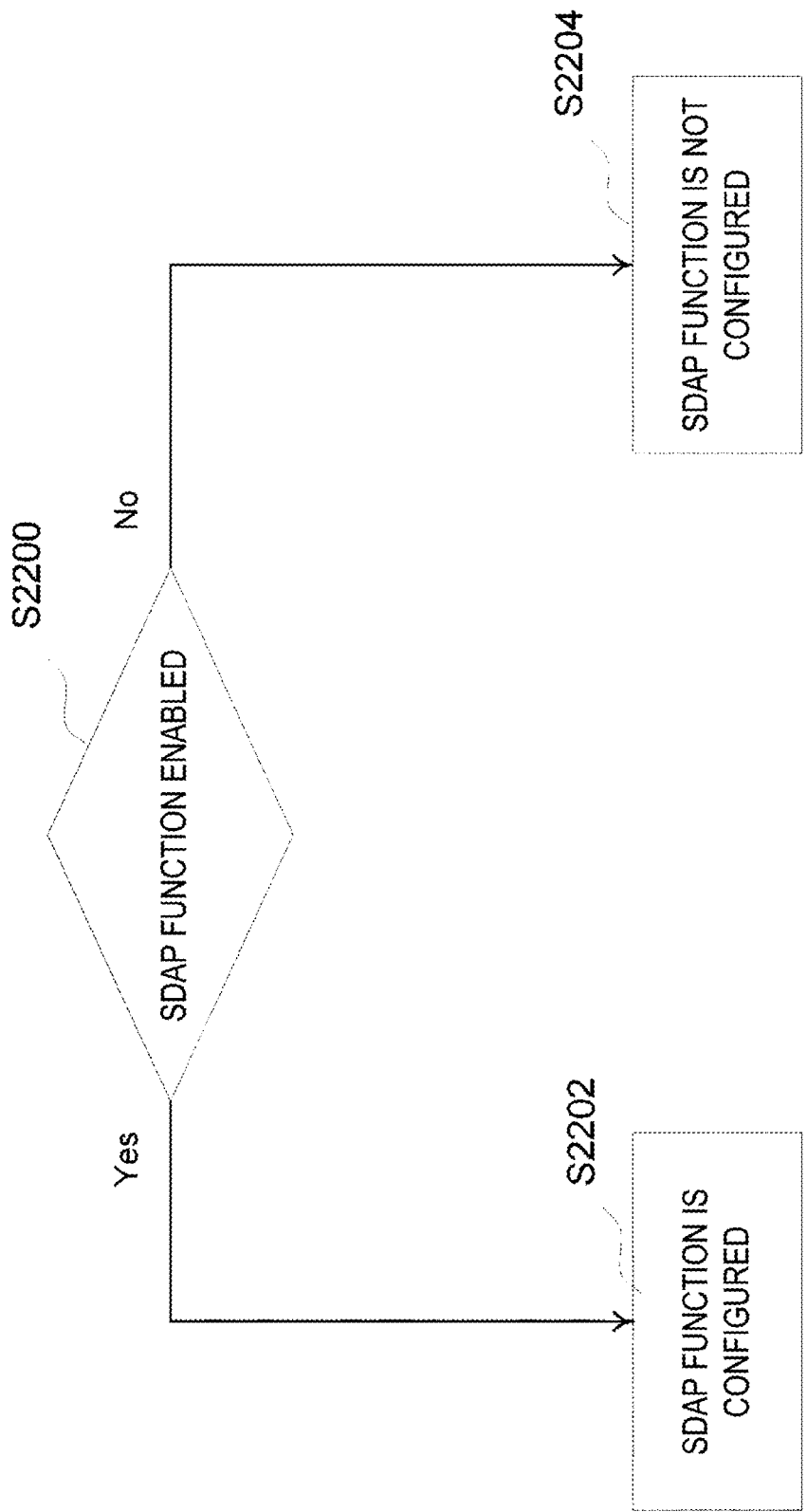
FIG. 22 is an example of determination of an SDAP configuration by the configuration unit of the terminal apparatus according to Embodiment 4 and Embodiment 5 of the present invention.

FIG. 22 is an example of determination of the SDAP configuration by the configuration unit of the terminal apparatus according to the embodiment of the present invention. The configuration unit 502 of the UE 122 checks whether the SDAP function is enabled or disabled (S2200). In a case that the function is enabled, the SDAP function is configured (S2202). In a case that the function is not enabled, that is, it is disabled, the SDAP function is not configured (S2204).

In FIG. 19, after completing the configuration in the configuration unit 502 of the UE 122, the UE 122 transmits an RRC connection reconfiguration complete (RRCConnectionReconfigurationComplete) message to either the eNB 102 or the gNB 108, or both the eNB 102 and the gNB 108 (S1906).

Note that the DRB configuration according to the present embodiment may be included in an RRC Connection Establishment procedure and an RRC Connection Re-Establishment procedure, in addition to the RRC connection reconfiguration procedure.

As described above, in the present embodiment, either the base station apparatus of E-UTRA (eNB) or the base station apparatus of NR (gNB), or both the eNB and the gNB determine whether the SDAP function to be used in communication with the UE is needed based on the condition of the application service, such as a voice call, and the like requested by the terminal apparatus (UE), and notify the UE of the result using the RRC connection reconfiguration message. Thus, the SDAP function suitable for the application service used by the UE can be used, and communication can be efficiently performed with reduced complexity of protocol processing.

Embodiment 5

Embodiment 2 will be described using FIGS. 1, 5, 10, and 20 to 23.

FIG. 10 is a diagram illustrating an example of a relationship between radio protocol architecture and RBs in EN-DC on the base station apparatus side according to the embodiment of the present invention.

The EN-DC may be a technology for performing data communication by using radio resources of two cell groups respectively configured by two base station apparatuses with EPC as a core network. The two base station apparatuses, that is, a base station apparatus of E-UTRA as a master base station (Master eNB or MeNB) and a base station apparatus of NR as a secondary base station (Secondary gNB or SgNB) respectively configures the two cell groups, that is, a Master Cell Group (MCG) configured by the MeNB and a Secondary Cell Group (SCG) configured by the SgNB. In the MR-DC, the master base station may be a base station having primary RRC functions related to the MR-DC, for example, establishment, change, and release of the RB, addition, change, and release of an additional cell such as a secondary cell, handover, and the like, and the secondary base station may be a base station having some RRC functions, for example, change and release of the SCG, and the like.

As illustrated in FIG. 10, in the EN-DC, some pieces of data to be transmitted and/or received is transmitted and/or received on the SgNB side, and the remainder is transmitted and/or received on the MeNB side. A data transmission and/or reception method in the EN-DC may include a method in which a node in the EPC serves as an anchor point as a point of bifurcation and confluence of data and each of the MeNB and the SgNB establishes a bearer as a logical path with the EPC to perform data transmission and/or reception, that is, data is transmitted and/or received using an MCG bearer on the MeNB side and an SCG bearer on the SgNB side, and a method in which the MeNB or the SeNB serves as the anchor point, and data transmission and/or reception is performed using a split bearer obtained by splitting a Radio Bearer (RB), which is a bearer on the radio side, for the MeNB and the SeNB. As for the split bearer, there may be a method for establishing the split bearer at the time of establishing the radio bearer and a method for establishing the MCG bearer or the SCG bearer and then changing the MCG bearer or the SCG bearer to the split bearer by adding the radio bearer on the SCG side or the MCG side. The establishment and change of the MCG bearer, the SCG bearer, and the split bearer may be performed in a Radio Resource Control (RRC) Connection Reconfiguration procedure transmitted between the MeNB and the UE. In the present embodiment, the cell group of the base station apparatus serving as the anchor point of the split bearer is referred to as an anchor cell Group, and the cell group of the base station apparatus that does not serve as the anchor point of the split bearer is referred to as an additional cell group. The anchor cell group may be the MCG, the additional cell group may be the SCG, the anchor cell group may be the SCG, and the additional cell group may be the MCG. The split bearer in a case that the anchor cell group is the MCG may be referred to as an MCG split bearer, and the split bearer in a case that the anchor cell group is the SCG may be referred to as an SCG split bearer.

In the EN-DC, with respect to downlink data in a case of data transmission and/or reception using the split bearer, part of the downlink data transferred from the EPC may be distributed by the base station apparatus of the anchor cell group to the base station apparatus of the additional cell group, and transmitted by the base station apparatus of the additional cell group to the UE, and the remaining data may be transmitted from the base station apparatus of the master cell group to the UE. With respect to uplink data, part of the uplink data may be transmitted by the UE to the base station apparatus of the additional cell group and distributed by the base station apparatus of the additional cell group to the base station apparatus of the master cell group, and the remaining data may be transmitted by the UE to the base station apparatus of the master cell group.

As illustrated in FIG. 10, in a case that the split bearer is used, the PDCP PDU may be transmitted and/or received between the base station apparatus of the master cell group and the base station apparatus of the additional cell group.

Figure 23:
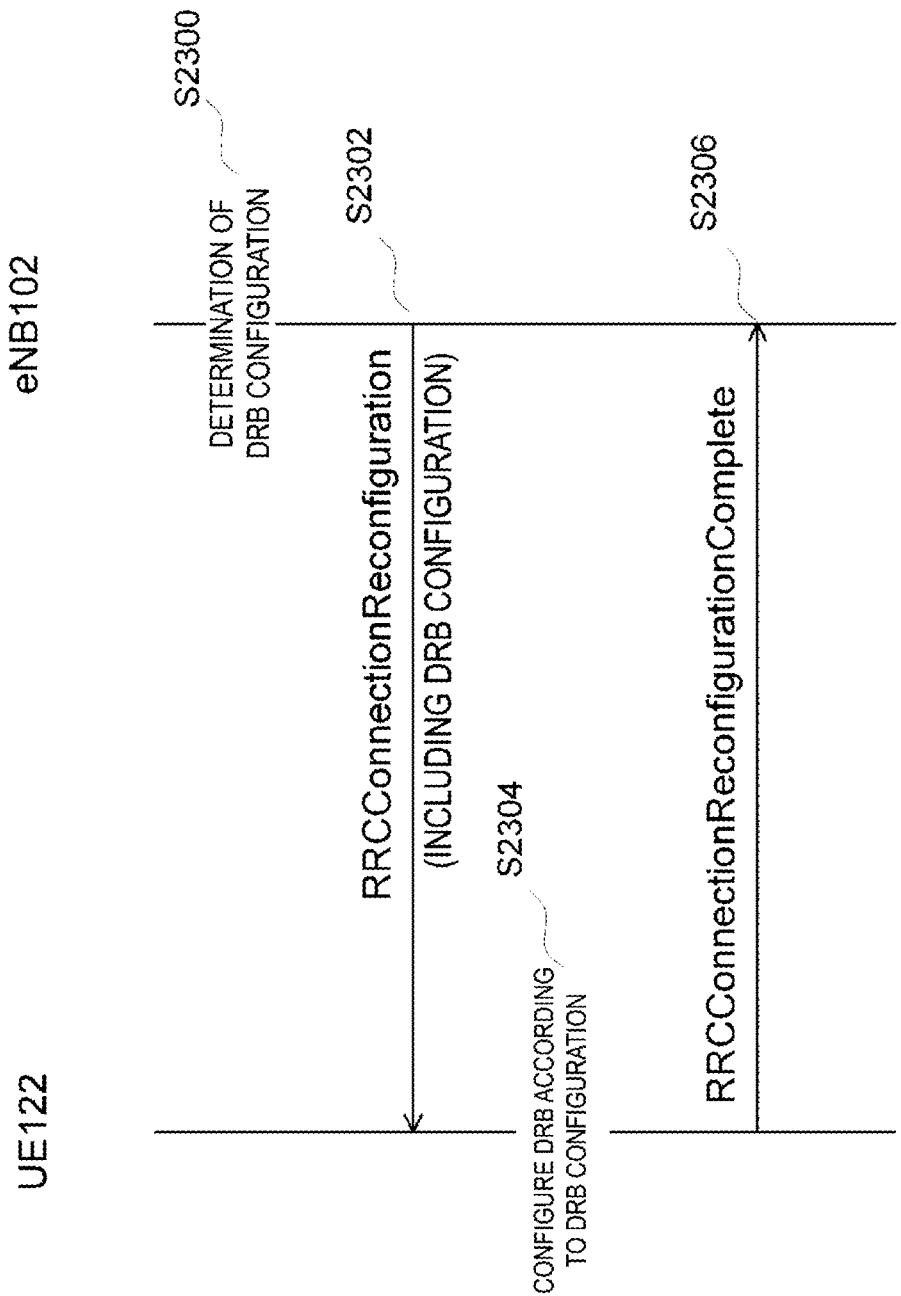
FIG. 23 is a diagram illustrating an example of the DRB configuration reception and configuration according to Embodiment 5 of the present invention.

FIG. 23 is a diagram illustrating an example of the DRB configuration reception and configuration in a case that the MCG bearer or SCG bearer is established as a bearer of the anchor cell group, or the split bearer is established according to the embodiment of the present invention. The eNB 102 determines the DRB configuration to be requested to the UE 122 (S2300). The eNB 102 may determine the DRB configuration based on either information from the core network (the EPC 104) or a capability of the UE 122, or the information from the core network and the capability of the UE 122. Note that the information from the core network may be determined based on a condition of an application service, such as a voice call, requested by the UE 122. Furthermore, the DRB configuration may be a configuration for the MCG bearer or a configuration for the SCG bearer, a configuration for the MCG bearer and the SCG bearer, or a configuration for the split bearer. Next, the eNB 102 generates an RRC connection reconfiguration request (RRC-ConnectionReconfiguration) message including the DRB configuration and transmits the message to the UE 122 (S2302). The receiver 500 of the UE 122 receives the RRC connection reconfiguration request message including the DRB configuration and transfers the DRB configuration to the configuration unit 502.

FIG. 20 is an example of Abstract Syntax Notation One (ASN.1) for the DRB configuration described in Embodiment 4.

In FIG. 20, DRB-ToAddMod is an IE of the DRB configuration. As illustrated in FIG. 20, DRB-ToAddMod may include SDAP-Config which is the SDAP configuration information. As illustrated in FIG. 20, SDAP-Config may include information indicating whether sdap-function, which is configuration information for an SDAP function, is to be enabled or disabled. The SDAP function may be an SDAP function including a function of managing the mapping between a QoS Flow Identifier (QFI) described in NPL 2 which is QoS information of the 5GC 110 and a DRB. Furthermore, the SDAP function may also be a function of including, in data transmitted by the UE 122 to either the eNB 102 or the gNB 108, or both the eNB 102 and the gNB 108, the same information as the QoS information included in data transmitted by either the eNB 102 or the gNB 108, or both the eNB 102 and the gNB 108 to the UE 122. Note that, as described in the present embodiment, in a case that the core network is the EPC 104, the SDAP function may be disabled. Note that the information indicating whether to be enabled or disabled may not be indicated with "enable" or "disable," but may be indicated with "activate" or "diactivate," or "true" or "false." Furthermore, the information indicating whether to be enabled or disabled may be other expressions. Furthermore, as illustrated in FIG. 20, PDCP-Config which is the PDCP configuration information may be included. Furthermore, as illustrated in FIG. 20, PDCP-Config may include the length of the SDAP header. The length of the SDAP header may be a length having a multiple value of 8. For example, in the example of FIG. 20, "len0bits," "len8bits," "len16bits," and "len24bits" may be 0 bits, 8 bits, 12 bits, and 24 bits, respectively. Alternatively, it may be indicated in units of byte such as "len0bytes," "len1byte," "len2bytes," or "len3bytes" or octet. Note that the length of the SDAP header being zero may mean that no SDAP header is present. Furthermore, an indication and designation of the length of the SDAP header is not limited thereto and another indication or designation may be possible.

FIG. 21 is another example of Abstract Syntax Notation One (ASN.1) for the DRB configuration described in Embodiment 4.

In FIG. 21, DRB-ToAddModSCG is an IE for the DRB configuration. Note that DRB-ToAddModSCG illustrated in FIG. 21 may be the DRB configuration for an additional cell group. As illustrated in FIG. 21, DRB-ToAddModSCG may include SDAP-Config, which is the SDAP configuration information. Furthermore, as illustrated in FIG. 21, SDAP-Config may include information indicating whether sdap-function, which is configuration information for the SDAP function, is to be enabled or disabled. The SDAP function may be an SDAP function including a function of managing the mapping between a QoS Flow Identifier (QFI) described in NPL 2 which is QoS information of the 5GC 110 and a DRB. Furthermore, the SDAP function may also be a function of including, in data transmitted by the UE 122 to either the eNB 102 or the gNB 108, or both the eNB 102 and the gNB 108, the same information as the QoS information included in data transmitted by either the eNB 102 or the gNB 108, or both the eNB 102 and the gNB 108 to the UE 122. Note that, as described in the present embodiment, in a case that the core network is the EPC 104, the SDAP function may be disabled. Note that the information indicating whether to be enabled or disabled may not be indicated with "enable" or "disable," but may be indicated with "activate" or "diactivate," or "true" or "not true." Furthermore, the information indicating whether to be enabled or disabled may be other expressions. Furthermore, as illustrated in FIG. 21, PDCP-Config which is the PDCP configuration information may be included. Furthermore, as also illustrated in FIG. 21, PDCP-Config may include the length of the SDAP header. The length of the SDAP header may be a length having a multiple value of 8. For example, in the example of FIG. 21, "len0bits," "len8bits," "len16bits," and "len24bits" may be 0 bits, 8 bits, 12 bits, and 24 bits, respectively. Alternatively, it may be indicated in units of byte such as "len0bytes," "len1byte," "len2bytes," or "len3bytes" or octet. Note that the length of the SDAP header being zero may mean that no SDAP header is present. Furthermore, an indication and designation of the length of the SDAP header is not limited thereto and another indication or designation may be possible.

Note that, in a case that the split bearer is established, the receiver 500 of the UE 122 may simultaneously receive DRB-ToAddModSCG which is the DRB configuration illustrated in FIG. 21 and DRB-ToAddMod which is the DRB configuration illustrated in FIG. 20. At this time, the value of DRB-Identity which is the DRB identity illustrated in FIG. 20 and the value of DRB-Identity which is the DRB identity illustrated in FIG. 21 may be the same. Additionally, drb-Type indicating a bearer type illustrated in FIG. 2 may be split for indicating the split bearer.

Note that ASN.1 in FIG. 20 or FIG. 21, or both FIG. 20 and FIG. 21 may be described in NPL 4. Furthermore, ASN.1 in FIG. 20 or FIG. 21, or both FIG. 20 and FIG. 21 may be described in NPL 10 and NPL 4 may refer thereto.

Furthermore, the message designation, IE designation, parameter designation, and the like of ASN.1 in FIGS. 20 and 21 are examples and other designations may be possible.

In S2304 of FIG. 23, the DRB configuration received by the configuration unit 502 of the UE 122 from the receiver 500 of the UE 122 may include the SDAP configuration. The configuration unit 502 of the UE 122 configures or reconfigures the SDAP according to the SDAP configuration.

FIG. 22 is an example of determination of the SDAP configuration by the configuration unit of the terminal apparatus according to the embodiment of the present invention described in Embodiment 4 of the present invention. The configuration unit 502 of the UE 122 checks whether the SDAP function is enabled or disabled (S2200). In a case that the function is enabled, the SDAP function is configured (S2202). In a case that the function is not enabled, that is, it is disabled, the SDAP function is not configured (S2204).

In FIG. 23, after completing the configuration in the configuration unit 502 of the UE 122, the UE 122 transmits an RRC connection reconfiguration complete (RRCConnectionReconfigurationComplete) message to the eNB 102 (S2306).

Note that the DRB configuration according to the present embodiment may be included in an RRC Connection Establishment procedure and an RRC Connection Re-Establishment procedure, in addition to the RRC connection reconfiguration procedure.

As described above, in the present embodiment, either the base station apparatus of E-UTRA (eNB) or the base station apparatus of NR (gNB), or both the eNB and the gNB determine whether the SDAP function to be used in communication with the UE is needed based on the condition of the application service, such as a voice call, and the like requested by the terminal apparatus (UE), even in the EN-DC, and notify the UE of the result by using the RRC connection reconfiguration message. Thus, the SDAP function suitable for the application service used by the UE can be used, and communication can be efficiently performed with reduced complexity of protocol processing.

Note that, although the notations regarding the RRC according to each embodiment of the present invention, for example, a message such as an RRC connection reconfiguration request message, ASN.1, and the like, are provided on the assumption of the RRC for NR (e.g., the RRC described in NPL 9 and NPL 10), they may be for LTE expansion (e.g., the RRC described in NPL 4), and may be transmitted and/or received between the base station apparatus for E-UTRA and the terminal apparatus supporting the MR-DC.

Furthermore, the re-establishment of each entity such as the PDCP entity according to each embodiment of the present invention may be performed by the RRC connection reconfiguration procedure at the time of handover. Furthermore, at the time of the re-establishment of each entity such as the PDCP entity according to each embodiment of the present invention, security configuration may also be reconfigured.

Furthermore, the length of the SDAP header according to each embodiment of the present invention may be configured differently between uplink (the direction from the terminal apparatus to the base station apparatus) and downlink (the direction from the base station apparatus to the terminal apparatus).

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be configured of a digital circuit, or may be configured of an analog circuit. Furthermore, in a case that with advances in semiconductor technology, a circuit integration technology appears that replaces the present integrated circuits, it is also possible to use an integrated circuit based on the technology.

Supplement

A terminal apparatus according to a first aspect of the present invention is a terminal apparatus for communicating with a base station apparatus; the terminal apparatus including a receiver configured to receive an RRC connection reconfiguration request message including a Data Radio Bearer (DRB) configuration from the base station apparatus and a configuration unit configured to perform a DRB configuration according to the DRB configuration, in which the DRB configuration includes an SDAP configuration, the SDAP configuration includes information indicating whether an SDAP function is to be enabled or disabled, in a case that the SDAP function is enabled, the SDAP function is configured, and in a case that the SDAP function is disabled, the SDAP function is not configured.

A terminal apparatus according to a second aspect of the present invention is a terminal apparatus supporting Multi Radio Access Technology Dual Connectivity (MR-DC) for Evolved Universal Terrestrial Radio Access (E-UTRA) and New Radio (NR), the terminal apparatus including a receiver configured to receive an RRC connection reconfiguration request message including a Data Radio Bearer (DRB) configuration of an anchor cell group or a configuration of an additional cell group from a master base station apparatus in a case that the E-UTRA is for a master cell group, and a configuration unit configured to configure a DRB according to the DRB configuration, in which the DRB configuration includes an SDAP configuration, the SDAP configuration includes information indicating whether an SDAP function is to be enabled or disabled, and in a case that the SDAP function is enabled, the SDAP function is configured, and in a case that the SDAP function is disabled, the SDAP function is not configured.

In a terminal apparatus according to a third aspect of the present invention, the SDAP function may include a function of managing mapping between QoS information of a core network and the DRB according to the above-described first or second aspect.

In a terminal apparatus according to a fourth aspect of the present invention, the DRB configuration may include a PDCP configuration, and the PDCP configuration may include information of a length of an SDAP header according to the above-described first or second aspect.

A terminal apparatus according to a fifth aspect of the present invention includes a receiver configured to receive an RRC reconfiguration request messages including a Data Radio Bearer (DRB) configuration from a base station apparatus, the DRB configuration including information indicating whether a Service Data Adaptation Protocol (SDAP) configuration is to be performed, and a configuration unit configured to perform an SDAP entity configuration in a case that the DRB configuration includes information indicating that the SDAP configuration is to be performed as the information, in which the SDAP entity configuration is a configuration based on the SDAP configuration, and the SDAP configuration includes information indicating whether there is an SDAP header.

A base station apparatus according to a sixth aspect of the present invention includes a generation unit configured to generate an RRC reconfiguration request message including a Data Radio Bearer (DRB) configuration and a transmitter configured to transmit the RRC reconfiguration request message to a terminal apparatus, in which the DRB configuration includes information indicating whether a Service Data Adaptation Protocol (SDAP) configuration is to be performed, the RRC reconfiguration request message including the DRB configuration causes the terminal apparatus to perform an SDAP entity configuration in a case that the DRB configuration includes information indicating that the SDAP configuration is to be performed as the information, the SDAP entity configuration is a configuration based on the SDAP configuration, and the SDAP configuration includes information indicating whether there is an SDAP header.

A method according to a seventh aspect of the present invention is a method performed by a terminal apparatus, the method including receiving an RRC reconfiguration request message including a Data Radio Bearer (DRB) configuration from a base station apparatus, the DRB configuration including information indicating whether a Service Data Adaptation Protocol (SDAP) configuration is to be performed, and performing an SDAP entity configuration in a case that the DRB configuration includes information indicating that the SDAP configuration is to be performed as the information, in which the SDAP entity configuration is a configuration based on the SDAP configuration, and the SDAP configuration includes information indicating whether there is an SDAP header.

A method according to an eighth aspect of the present invention is a method performed by a base station apparatus, the method including generating an RRC reconfiguration request message including a Data Radio Bearer (DRB) configuration and transmitting the RRC reconfiguration request message to a terminal apparatus, in which the DRB configuration includes information indicating whether a Service Data Adaptation Protocol (SDAP) configuration is to be performed, the RRC reconfiguration request message including the DRB configuration causes the terminal apparatus to perform an SDAP entity configuration in a case that the DRB configuration includes information indicating that the SDAP configuration is to be performed as the information, the SDAP entity configuration is a configuration based on the SDAP configuration, and the SDAP configuration includes information indicating whether there is an SDAP header.

A terminal apparatus according to a ninth aspect of the present invention is a terminal apparatus for communicating with a base station apparatus, the terminal apparatus including a receiver configured to receive an RRC connection reconfiguration request message including a Data Radio Bearer (DRB) configuration from the base station apparatus, and a configuration unit configured to configure a DRB according to the DRB configuration, in which the DRB configuration includes a DRB identity and a PDCP configuration corresponding to the DRB identity, a value of the DRB identity is not present in current configuration of the terminal apparatus, the PDCP configuration information includes one of the PDCP configuration for E-UTRA and the PDCP configuration for NR, and in a case that the PDCP configuration information includes the PDCP configuration information for E-UTRA, a PDCP entity is established in accordance with the PDCP configuration information, and in a case that the PDCP configuration information includes the PDCP configuration information for NR, the PDCP entity is established in accordance with the PDCP configuration information.

A terminal apparatus according to a tenth aspect of the present invention is a terminal apparatus for communicating with a base station apparatus, the terminal apparatus including a receiver configured to receive an RRC connection reconfiguration request message including a Data Radio Bearer (DRB) configuration from the base station apparatus, and a configuration unit configured to configure a DRB according to the DRB configuration, in which the DRB configuration includes a DRB identity and a PDCP configuration corresponding to the DRB identity, a value of the DRB identity is present in current configuration of the terminal apparatus, the PDCP configuration information includes one of the PDCP configuration for E-UTRA and the PDCP configuration for NR, and in a case that the PDCP configuration information includes the PDCP configuration information for E-UTRA, a PDCP entity is re-established in accordance with the PDCP configuration information, and in a case that the PDCP configuration information includes the PDCP configuration information for NR, the PDCP entity is established in accordance with the PDCP configuration information.

A terminal apparatus according to an eleventh aspect of the present invention is a terminal apparatus supporting Multi Radio Access Technology Dual Connectivity (MR-DC) for Evolved Universal Terrestrial Radio Access (E-UTRA) and New Radio (NR), the terminal apparatus including a receiver configured to receive an RRC connection reconfiguration request message including a Data Radio Bearer (DRB) configuration of an anchor cell group from a master base station apparatus in a case that the E-UTRA is for a master cell group, and a configuration unit configured to configure a DRB according to the DRB configuration, in which the DRB configuration includes a DRB identity and a PDCP configuration corresponding to the DRB identity, a value of the DRB identity is not present in current configuration of the terminal apparatus, the PDCP configuration information includes one of the PDCP configuration for E-UTRA and the PDCP configuration for NR, and in a case that the PDCP configuration information includes the PDCP configuration information for E-UTRA, a PDCP entity is established in accordance with the PDCP configuration information, and in a case that the PDCP configuration information includes the PDCP configuration information for NR, the PDCP entity is established in accordance with the PDCP configuration information.

A terminal apparatus according to a twelfth aspect of the present invention is a terminal apparatus supporting Multi Radio Access Technology Dual Connectivity (MR-DC) for Evolved Universal Terrestrial Radio Access (E-UTRA) and New Radio (NR), the terminal apparatus including a receiver configured to receive an RRC connection reconfiguration request message including a Data Radio Bearer (DRB) configuration of an anchor cell group from a master base station apparatus in a case that the E-UTRA is for a master cell group, and a configuration unit configured to configure a DRB according to the DRB configuration, in which the DRB configuration includes a DRB identity and a PDCP configuration corresponding to the DRB identity, a value of the DRB identity is present in current configuration of the terminal apparatus, the PDCP configuration information includes one of the PDCP configuration for E-UTRA and the PDCP configuration for NR, and in a case that the PDCP configuration information includes the PDCP configuration information for E-UTRA, a PDCP entity is re-established in accordance with the PDCP configuration information, and in a case that the PDCP configuration information includes the PDCP configuration information for NR, the PDCP entity is re-established in accordance with the PDCP configuration information.

A terminal apparatus according to a thirteenth aspect of the present invention is a terminal apparatus supporting Multi Radio Access Technology Dual Connectivity (MR-DC) for Evolved Universal Terrestrial Radio Access (E-UTRA) and New Radio (NR), the terminal apparatus including a receiver configured to receive an RRC connection reconfiguration request message including a Data Radio Bearer (DRB) configuration of an anchor cell group and the DRB configuration for an additional cell group from a master base station apparatus in a case that E-UTRA is for a master cell group, and a configuration unit configured to configure a DRB according to the DRB configuration, in which the DRB configuration of the anchor cell group includes a DRB identity of the anchor cell group and a PDCP configuration corresponding to the DRB identity of the anchor cell group, the DRB configuration of the additional cell group includes the DRB identity of the anchor cell group and information indicating that a DRB type is split, and a PDCP entity of the anchor cell group is re-established in accordance with PDCP configuration information included in the DRB configuration of the anchor cell group corresponding to the DRB identity of the anchor cell group.

A terminal apparatus according to a fourteenth aspect of the present invention is a terminal apparatus for communicating with a base station apparatus, the terminal apparatus including a receiver configured to receive an RRC connection reconfiguration request message including a Data Radio Bearer (DRB) configuration from the base station apparatus, and a configuration unit configured to configure a DRB according to the DRB configuration, in which the DRB configuration includes a DRB identity and an SDAP configuration corresponding to the DRB identity, a value of the DRB identity is not present in current configuration of the terminal apparatus, the SDAP configuration includes a length of an SDAP header, the length of the SDAP header is one or more of values of integral multiple of 8 including zero, and an SDAP entity is established in accordance with the SDAP configuration information.

A terminal apparatus according to a fifteenth aspect of the present invention is a terminal apparatus for communicating with a base station apparatus, the terminal apparatus including a receiver configured to receive an RRC connection reconfiguration request message including a Data Radio Bearer (DRB) configuration from the base station apparatus, and a configuration unit configured to configure a DRB according to the DRB configuration, in which the DRB configuration includes a DRB identity and an SDAP configuration corresponding to the DRB identity, a value of the DRB identity is present in current configuration of the terminal apparatus, the SDAP configuration includes a length of an SDAP header, the length of the SDAP header is one or more of values of integral multiple of 8 including zero, and an SDAP entity is re-established in accordance with the SDAP configuration information.

A terminal apparatus according to a sixteenth aspect of the present invention is a terminal apparatus for communicating with a base station apparatus, the terminal apparatus including a receiver configured to receive an RRC connection reconfiguration request message including a Data Radio Bearer (DRB) configuration from the base station apparatus, and a configuration unit configured to configure a DRB according to the DRB configuration, in which the DRB configuration includes an SDAP configuration, the SDAP configuration includes information indicating whether an SDAP function is to be enabled or disabled, in a case that the SDAP function is enabled, the SDAP function is configured, and in a case that the SDAP function is disabled, the SDAP function is not configured.

A terminal apparatus according to a seventeenth aspect of the present invention is a terminal apparatus supporting Multi Radio Access Technology Dual Connectivity (MR-DC) for Evolved Universal Terrestrial Radio Access (E-UTRA) and New Radio (NR), the terminal apparatus including a receiver configured to receive an RRC connection reconfiguration request message including a Data Radio Bearer (DRB) configuration of an anchor cell group or a configuration of an additional cell group from a master base station apparatus in a case that the E-UTRA is for a master cell group, a configuration unit configured to configure a DRB according to the DRB configuration, in which the DRB configuration includes an SDAP configuration, the SDAP configuration includes information indicating whether an SDAP function is to be enabled or disabled, and in a case that the SDAP function is enabled, the SDAP function is configured, and in a case that the SDAP function is disabled, the SDAP function is not configured.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Note that the invention of the present patent application is not limited to the above-described embodiments. According to the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application claims the benefit of priority to JP 2017-126273 filed on Jun. 28, 2017, which is incorporated herein by reference in its entirety.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
500 Receiver
502 Configuration unit

The invention claimed is:

1. A terminal apparatus comprising:
receiving circuitry configured to receive an RRC reconfiguration message including a Data Radio Bearer (DRB) configuration from a base station apparatus, the DRB configuration being generated by the base station apparatus based on information received from a core network, the information indicating a Quality of Service (QoS) associated with an application service requested by the terminal apparatus, the DRB configuration comprising information indicating whether a Service Data Adaptation Protocol (SDAP) function is to be configured, the SDAP function for managing a QoS Flow Identifier (QFI) to DRB mapping, wherein the QFI is associated with QoS information of a 5G Core (5GC) network; and
a setting circuitry configured to determine, in accordance with the DRB configuration, whether to configure the SDAP function.

2. The terminal apparatus according to claim 1, wherein if a core network to which a base station associated with the terminal apparatus is connected comprises an Evolved Packet Core (EPC) network, the configuration information indicates that the SDAP function is to be disabled.

3. The terminal apparatus according to claim 1, wherein the application service comprises a voice call.

4. A base station apparatus, comprising:
generation circuitry configured to generate an RRC reconfiguration message including a Data Radio Bearer (DRB) configuration, the DRB configuration being generated based on information received from a core network, the information indicating a Quality of Service (QoS) associated with an application service requested by a terminal apparatus, the DRB configuration comprising information indicating whether a Service Data Adaptation Protocol (SDAP) function is to be configured, the SDAP function includes for managing a QoS Flow Identifier (QFI) to DRB mapping, wherein the QFI is associated with QoS information of a 5G Core (5GC) network; and
transmitting circuitry configured to transmit the RRC reconfiguration message to the terminal apparatus, wherein
the RRC reconfiguration message including the DRB configuration causes the terminal apparatus to determine, in accordance with the DRB configuration, whether to configure the SDAP function.

5. The base station apparatus according to claim 4, wherein
if a core network to which the base station is connected comprises an Evolved Packet Core (EPC) network, the configuration information indicates that the SDAP function is to be disabled.

6. The base station apparatus according to claim 4, wherein the application service comprises a voice call.

7. A method performed by a terminal apparatus, the method comprising:
receiving an RRC reconfiguration message including a Data Radio Bearer (DRB) configuration from a base station apparatus, the DRB configuration being generated by the base station apparatus based on information received from a core network, the information indicating a Quality of Service (QoS) associated with an application service requested by the terminal apparatus, the DRB configuration comprising information indicating whether a Service Data Adaptation Protocol (SDAP) function is to be configured, the SDAP function for managing a QoS Flow Identifier (QFI) to DRB mapping, wherein the QFI is associated with QoS information of a 5G Core (5GC) network; and determining, in accordance with the DRB configuration, whether to configure the SDAP function.

8. A method performed by a base station apparatus, the method comprising:

generating an RRC reconfiguration message including a Data Radio Bearer (DRB) configuration, the DRB configuration being generated based on information received from a core network, the information indicating a Quality of Service (QoS) associated with an application service requested by a terminal apparatus, the DRB configuration comprising information indicating whether a Service Data Adaptation Protocol (SDAP) function is to be configured, the SDAP function for managing a QoS Flow Identifier (QFI) to DRB mapping, wherein the QFI is associated with QoS information of a 5G Core (5GC) network; and transmitting the RRC reconfiguration message to the terminal apparatus, wherein the RRC reconfiguration message including the DRB configuration causes the terminal apparatus to determine, in accordance with the DRB configuration, whether to configure the SDAP function.

\* \* \* \* \*